| (12) | United States Patent | (10) Patent No.: US 9,643,860 B2 |
|---|---|---|
| | Katyal | (45) Date of Patent: May 9, 2017 |

(54) SYSTEM AND METHOD FOR HYDRATE-BASED DESALINATION

(71) Applicant: Amit Katyal, New Delhi (IN)

(72) Inventor: Amit Katyal, New Delhi (IN)

( * ) Notice: Subject to any disclaimer, the term of this patent is extended or adjusted under 35 U.S.C. 154(b) by 651 days.

(21) Appl. No.: 14/233,977

(22) PCT Filed: Oct. 25, 2012

(86) PCT No.: PCT/IN2012/000705
§ 371 (c)(1),
(2) Date: Jan. 21, 2014

(87) PCT Pub. No.: WO2013/076737
PCT Pub. Date: May 30, 2013

(65) Prior Publication Data
US 2014/0158635 A1 Jun. 12, 2014

(30) Foreign Application Priority Data

Nov. 25, 2011 (IN) .......................... 3385/DEL/2011
Jan. 10, 2012 (IN) .............................. 87/DEL/2012
May 4, 2012 (IN) .......................... 1384/DEL/2012

(51) Int. Cl.
*B01D 9/04* (2006.01)
*B01D 17/00* (2006.01)
(Continued)

(52) U.S. Cl.
CPC .............. *C02F 1/22* (2013.01); *B01D 9/0059* (2013.01); *B01D 19/0042* (2013.01);
(Continued)

(58) Field of Classification Search
CPC . B01D 9/00; B01D 9/04; B01D 9/005; B01D 9/0059; B01D 2009/0086;
(Continued)

(56) References Cited

U.S. PATENT DOCUMENTS 2,904,511 A * 9/1959 Donath ................... B01J 14/00
210/194
3,119,772 A * 1/1964 Jones, Jr. .................. C02F 1/22
210/205

(Continued)

OTHER PUBLICATIONS

Publication by Peter J. Davies et al, "Managing producing water from coal seam gas projects: implications for an emerging industry in Australia", Environ. Sci. Pollut. Res.; Published 2015, vol. 22, pp. 10981-11000.*

(Continued)

*Primary Examiner* — Joseph Drodge
(74) *Attorney, Agent, or Firm* — Andrew W. Chu; Craft Chu PLLC

(57) ABSTRACT

The present invention relates to systems and methods for desalinating and/or treating polluted water. More particularly, the present invention relates to systems and methods for desalinating and/or treating polluted water using gas hydrates. In particular, the system comprises a desalination tank configured to form gas hydrates using a suitable hydrate former taken from a storage tank that is operatively connected to the desalination tank. With all operations, including formation of gas hydrates, discharging of highly saline water, washing the gas hydrates and dissociation of gas hydrates being conducted in a single pressurized tank such as the desalination tank, the present apparatus provides a simple and efficient solution at a low manufacturing and operating cost.

25 Claims, 13 Drawing Sheets

(51) Int. Cl.
*B01D 19/00* (2006.01)
*B01D 21/24* (2006.01)
*C02F 1/22* (2006.01)
*C02F 1/52* (2006.01)
*E21B 21/06* (2006.01)
*E21B 43/34* (2006.01)
*B01D 9/00* (2006.01)
*C02F 103/08* (2006.01)

(52) U.S. Cl.
CPC ..... *B01D 21/2405* (2013.01); *B01D 21/2488* (2013.01); *C02F 1/5209* (2013.01); *C02F 1/5236* (2013.01); *C02F 2103/08* (2013.01)

(58) Field of Classification Search
CPC ...... B01D 2009/009; B01D 2009/0095; B01D 17/00; B01D 9/02; B01D 19/00; B01D 19/0042; B01D 19/0047; B01D 19/0068; B01D 21/00; B01D 21/0084; B01D 21/10; B01D 21/24; B01D 21/2405; B01D 21/2427; B01D 21/2488; C02F 1/22; C02F 1/52; C02F 1/5209; C02F 1/5236; C02F 1/5281; C02F 2001/5218; C01F 2103/06; C01F 2103/08; C01F 2103/36; E21B 21/06; E21B 21/063; E21B 21/068; E21B 43/01; E21B 43/34; E21B 2043/0115
USPC .......... 62/532, 533, 541, 542; 210/175, 181, 210/182, 202, 205, 206, 220, 257.1, 258, 210/259, 639, 702, 711, 712, 714, 737, 210/747.1, 747.7, 747.5, 747.8, 774, 806; 203/10, 11, 29, 48; 202/96, 152; 175/66, 175/206, 207
See application file for complete search history.

(56) References Cited

U.S. PATENT DOCUMENTS

| | | | | |
|---|---|---|---|---|
| 3,148,143 | A * | 9/1964 | Donath | C02F 1/22 210/711 |
| 3,269,136 | A * | 8/1966 | Umano | C02F 1/22 62/123 |
| 6,028,234 | A * | 2/2000 | Heinemann | C10L 3/08 137/13 |
| 6,821,439 | B1 * | 11/2004 | Currier | C02F 1/22 210/711 |
| 7,560,028 | B1 * | 7/2009 | Simmons | C02F 1/22 205/747 |
| 7,794,603 | B2 * | 9/2010 | Skjetne | B01D 53/14 210/705 |
| 2004/0195160 | A1 * | 10/2004 | Max | A23L 2/08 210/177 |
| 2007/0004945 | A1 * | 1/2007 | Phelps | C02F 1/22 585/15 |

OTHER PUBLICATIONS

Publication by Kyeong-nam Park et al, "A new apparatus for seawater desalination by gas hydrate process and removal characteristics of dissolved minerals", Published Feb. 23, 2011, Desalination, vol. 274, pp. 91-96.*

* cited by examiner

SYSTEM AND METHOD FOR HYDRATE-BASED DESALINATION

FIELD OF THE INVENTION

The present invention relates to systems and methods for desalinating and/or treating polluted water. More particularly, the present invention relates to systems and methods for desalinating and/or treating polluted water using gas hydrates.

BACKGROUND OF THE INVENTION

Gas Hydrates are ice-like, solid crystalline compounds formed of water molecules and gas molecules, in which each gas molecule is included inside a cage formed of hydrogen-bonded water molecules with a three-dimensional lattice structure. Gas molecules used for forming gas hydrates generally include low molecular weight gases like $O_2$, $H_2$, $N_2$, $CO_2$, $CH_4$ and $H_2S$ and inert gases like Ar, Kr or Xe. However, some higher hydrocarbons such as ethane, propane and butane and freons also form gas hydrates. Although gas hydrates are similar in structure to ice, they are stable at temperatures higher than 0 degree Celsius (the freezing point of water) and at pressures above atmospheric pressure. When hydrates are formed out of saline or polluted water, they exclude all salts and other impurities and when the hydrates are dissociated, pure gas and desalinated water are produced. Gas hydrates are used, particularly, in a desalination or water treatment apparatus, as a technology for removing salts and impurities from water.

There are certain types of deep gas wells producing gas by hydraulic fracturing (also known as "fracking") of deep shale deposits with mixtures of water, particulates and chemicals under high pressure that produce very highly saline water with salinities ranging from 50000 mg/l to 150000 mg/l of salt. Presently, there is no cost effective means to desalinate this highly saline water and consequently it is often disposed of in a manner that is harmful to the environment, particularly surface waters and the biota therein. In addition, the lack of a cost effective desalination method for highly saline waters has caused many governments to either ban hydraulic fracturing outright or limit its application. However, once a cost effective method of desalination of fracking wastewater is available, government regulations can be expected to reflect the performance levels that it can achieve.

A cost effective desalination method for highly saline waters will have universal application in all kinds of other wastewater treatment problems also.

Different methodologies using formation and dissociation of gas hydrates are used for desalination/treatment of water, some of which are discussed in the following documents. However, none of these technologies disclose a technically and commercially effective method for desalinating water of such high salinity up to its maximum possible eutectic composition of 230000 mg/l.

A recent United States Patent Publication US 2011/0064643 discloses an apparatus for continuously producing and pelletizing gas hydrates using a squeezing operation of a dual cylinder unit in a reactor. The apparatus comprises of a gas supply unit; a water supply unit; and a reactor into which gas and water are respectively supplied from the gas supply unit and the water supply unit. The slurry is squeezed by a squeezing stroke of the upper and lower pistons configured into upper and lower cylinders.

U.S. Pat. No. 6,158,239 discloses a method of desalination seawater by adding methane into seawater at a depth exceeding 100 meters to form methane hydrate which rises to where it is decomposed into methane and water, and recovering desalinated water. Methane is recycled to depth to form more buoyant hydrate.

U.S. Pat. No. 6,991,722 discloses an apparatus for desalinating input water, comprising: a desalination fractionation installation having a hydrate formation region disposed at a lower portion and a hydrate dissociation region disposed at an upper portion thereof; a mixing chamber; an input water conduit which is arranged to provide input water to the mixing chamber and to the hydrate formation region; and a gas supply conduit which is arranged to provide hydrate former to the mixing chamber and to the hydrate formation region; wherein hydrate former is dissolved into at least a portion of the input water in said mixing chamber prior to being input into said hydrate formation region.

Another technique disclosed in U.S. Pat. No. 7,569,737 describes a method for removing salts and/or other dissolved materials from water, using co-flow injection technology to form hydrate slurry, rapid depressurization the hydrate slurry to convert it into an ice-like clathrate hydrate mass and melting the an ice-like clathrate hydrate mass to first remove encapsulated salt and then recover purified water contained therein.

Another U.S. Pat. No. 7,794,603 B2 discloses a method of purification of contaminated water, wherein the water to be purified is passed through a first pipe into a first container to obtain hydrate formation, followed by mixing with a hydrate-forming compound which is supplied via a second pipe, wherein a portion of the mixture of hydrate and contaminated water is recycled to the first container via a third pipe as hydrate-forming seed, and the rest is passed to a separator where the mixture is separated into contaminated water and a hydrate. The hydrate is then passed to a second container via a fourth pipe, wherein, in the second container, the temperature is raised so that the hydrate dissociates into pure water and hydrate-forming compound, the hydrate-forming compound from said second container is passed back to the first container for hydrate formation via said second pipe and the pure water is taken out as a product. However, this method and apparatus requires number of vessels and costly transfer of hydrates between the vessels which makes this method cumbersome, less efficient and cost intensive.

Masayoshi Takahashi et al, describes a method for making gas hydrate comprising generating ultrafine bubbles in an aqueous solution and spontaneously generating hydrate nuclei by self-compression and collapsing of the ultrafine bubbles See Masayoshi Takahashi et al, "Effect of Shrinking Microbubble on Gas Hydrate Formation, The Journal of Physical Chemistry, 107, No. 10, 2003.

U.S. Pat. No. 2,904,511 discloses a method and apparatus for separating water from aqueous saline solutions and producing purified water from sea water through use of hydrate-forming reactions. The method comprises introducing a stream of aqueous saline solution into a hydrate-forming and hydrate-decomposing system, wherein the stream of aqueous saline solution is interacted with the hydrate-forming substance in a hydrate-forming zone. However, the apparatus of '511 involves multiple vessels and allied components including hydrate-forming vessel, hydrate-decomposing vessel, a hydrate conveyer, means for introducing water, and means for recycling hydrate-forming gas, making the overall system complex, expensive, and difficult to operate.

Therefore, none of the known techniques that are disclosed effectively desalinate saline water of wide range of salinities ranging from low levels of salinity to the maximum possible levels of salinity up to eutectic saline composition. There is currently no cost effective method for desalinating such highly saline water, and furthermore, no desalination technology based on gas hydrates has been disclosed that can effectively desalinate such highly saline water. The known desalination techniques require high capital and operating costs (including energy costs). Furthermore, carrying out different operations of the gas-hydrate based desalination techniques, including hydrate formation, expulsion of concentrated higher saline/polluted water, hydrate washing and hydrate dissociation, in different tanks/containers further results in an increase in cost and complexity of the structure and a decrease in efficiency. Further, known water purification technologies also do not provide an effective and easy control of pressure and temperature conditions during operation of hydrate-formation and disassociation, which is an integral part of desalination or water treatment processes.

There is, therefore, a need for an apparatus and method for significantly improving the efficiency of water treatment by desalinating saline water or treating polluted water from low levels of salinity to the maximum possible levels of salinity and at the same time using safe and cost-efficient techniques to implement the method.

OBJECTS OF THE INVENTION

It is an object of the invention to treat and/or desalinate highly saline water ranging from low levels of salinity to the maximum possible levels of salinity in water.

It is an object of the invention to use one single desalination tank to carry out different operations of the gas-hydrate based desalination process including hydrate formation, expulsion of concentrated highly saline/polluted water from the hydrate, hydrate washing and hydrate dissociation.

It is another object of the invention to maintain and control the pressure and temperature of the overall system and specifically of the desalination tank and the storage tank.

It is another object of the invention to use fresh water to wash gas hydrates.

It is another object of the invention to use pumps, valves, and other such components and resources to optimize the working and implementation of the desalination/water treatment system.

It is yet another object of the invention to maintain a liquid seal layer in the desalination tank to prevent hydrate former from escaping.

It is yet another object of the invention to store the hydrate former in liquid form in a storage tank.

It is yet another object of the invention to use one or more desalination and/or storage tanks in multiple configurations.

It is another object of the invention to allow multiple pairs of desalination and storage tanks to work together such that when one pair is operating in the hydrate formation phase, the other pair is operating in the hydrate dissociation phase.

It is yet another object of the invention to use a microbubble generator to make gas hydrates from microbubbles.

It is yet another object of the invention to crystallize salt from the highly saline water and suitably remove the same from the desalination tank.

SUMMARY OF THE INVENTION

The present invention provides an apparatus and method for desalinating or treating polluted water ranging from low levels of salinity to the maximum possible levels of salinity up to eutectic saline composition using a hydrate former under sufficient temperature and pressure conditions. In one embodiment, the apparatus comprises a desalination tank configured to form gas hydrates using a suitable hydrate-former taken from a storage tank that is operatively connected to the desalination tank. The desalination tank can be further configured to discharge the remaining concentrated highly saline water formed after formation of the gas hydrates through a suitable outlet and washing the gas hydrates to remove surface salt. The desalination tank can further be configured to allow the dissociation of the formed gas hydrates to give desalinated/treated water and gas, wherein the gas can be returned back to the storage tank for further reuse. With all operations, including the formation of gas hydrates, discharging of highly saline water, washing of gas hydrates and dissociation of gas hydrates being conducted in a single pressurized tank such as the desalination tank, the present apparatus provides a simple and efficient solution at a low manufacturing and operating cost.

In one embodiment, the desalination tank and the storage tank can be connected through a connecting pipe that allows the free flow of the hydrate former between the tanks through pressure differential, thereby constantly maintaining the pressure of both the tanks.

In another aspect of the present invention, the saline or polluted water is pumped into the desalination tank from a feed water tank. As the water level in the desalination tank increases, more and more hydrate former can be displaced from the desalination tank and transported back into the storage tank where it can be liquefied under suitable temperature, while maintaining a constant pressure in the system. Once a fixed amount of saline water is pumped into the desalination tank, gas hydrates can be formed by conversion of microbubbles of the hydrate forming gas formed using a microbubble generator system at suitable pressure and temperature conditions.

The microbubble generator system can comprise a microbubble nozzle and a microbubble generator pump, wherein the microbubble generator pump can be configured to take saline or polluted water from the desalination tank and pump it through the nozzle, wherein the nozzle is connected to the vapour space of the desalination tank through a pipe. Pumping of the water through the nozzle can result in the formation of a low pressure region at the point of connection of the nozzle and the pipe from the vapour space of the desalination tank, resulting in the sucking of the hydrate former into the nozzle and further resulting in the conversion of the hydrate former into microbubbles of a specified size. The microbubbles are then expelled along with pumped water into the desalination tank. These microbubbles of a hydrate former are almost instantaneously converted to gas hydrates under suitable conditions of pressure and temperature.

As hydrates form, they expel salt into the remaining saline water increasing the salinity of remaining saline water. At the end of the process, the highly concentrated saline water can be removed through an outlet at the bottom of the desalination tank. As the removal of the concentrated saline water from the bottom of the desalination tank results in the receding of the water column, gas hydrates, which are floating on top of the water column in the form of slurry, also recede, causing gas to flow from the storage tank into the desalination tank. Further, some water can also be left in the desalination tank such that this remaining water acts as a liquid seal that prevents gas from escaping from the bottom outlet.

In an embodiment of the invention, the gas hydrates can be washed using a plurality of small nozzles located at the lower portion of the desalination tank from where desalinated water, stored in a fresh water tank, can be sprayed into the gas hydrates, resulting in the washing of the salt from the surface of the hydrates. The hydrate wash water can then be put back into the feed water tank. Dissociation of the gas hydrates can take place under suitable conditions of temperature and pressure, which results in the release of the hydrate former and desalinated water. The desalinated water can be stored in the fresh water tank through one or more flow water valves. The hydrate former can be transported back to the storage tank, wherein under the suitable temperature, the hydrate-forming gas can be converted back into a liquid state. Hydrate washing can be carried out one or more times to result in the complete washing of the hydrates and result in significantly lowering the amount of salt on the surface of the hydrates.

In one aspect of the invention, the hydrate former can be selected from the group comprising $C_1$-$C_5$ hydrocarbons such as methane, ethane, propane and the like, $CO_2$, $O_2$, $H_2$, $N_2$, $H_2S$, inert gases and mixtures thereof.

In another aspect, the present invention provides for the crystallization of the salt in the desalination tank, resulting in substantial saving in capital and energy costs compared with conventional methods of desalination of high salinity water such as distillation. In one embodiment, the salt crystals can be removed from the bottom of the desalination tank through a salt crystal removal valve.

The present invention allows for a cost-effective desalination system by treating saline water ranging from low levels of salinity to maximum possible eutectic levels of salinity in water. The desalination system can also allow eutectic saline water that remains after formation of the gas hydrates to crystallize into salt which can result in almost complete recovery of desalinated water from saline water. Furthermore, storage of the gas in liquid form in the storage tank at controlled and fast response pressure and temperate conditions can allow free flow of the gas from the storage tank to the desalination tank and vice-versa. Furthermore, usage of the feed water from the feed water tank and fresh water from the fresh water tank for gas hydrate formation as well as for hydrate washing, allows for the efficient usage of the water.

DETAILED DESCRIPTION OF THE INVENTION

Figure 1:
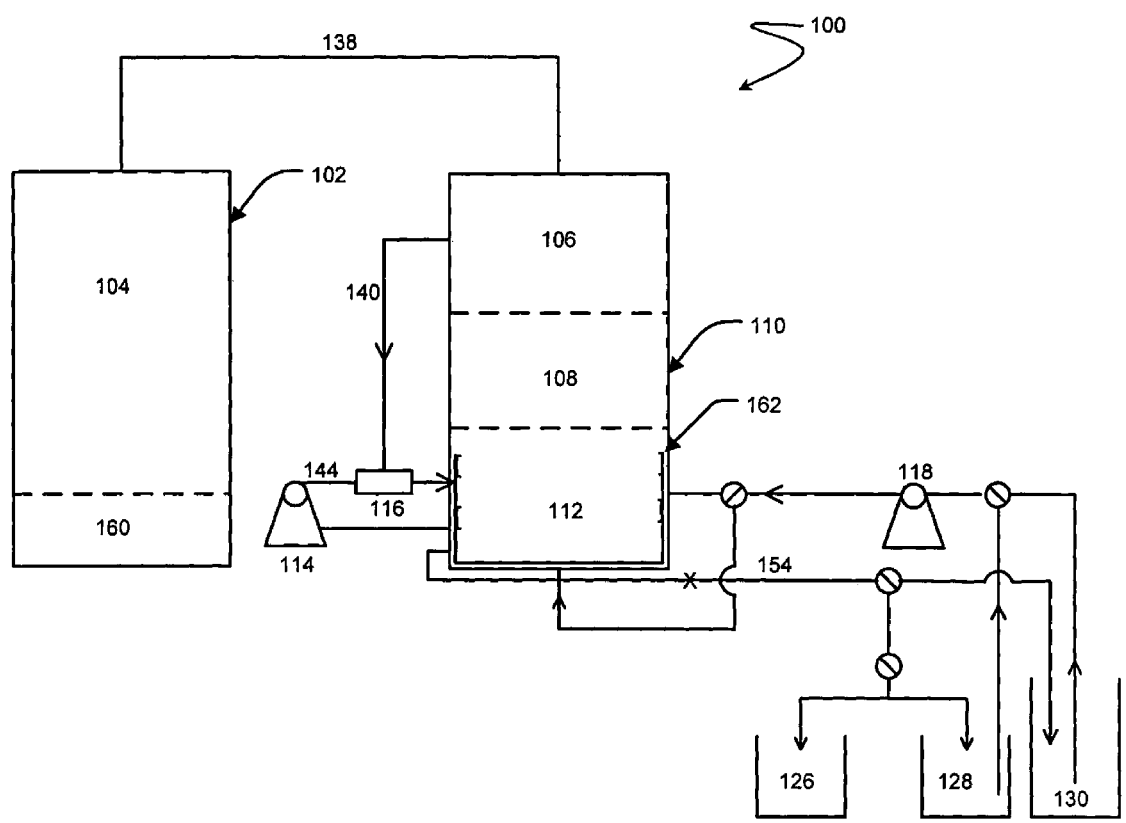
FIG. 1 illustrates a first embodiment of the gas hydrate based desalination and/or water treatment system.

The following discussion provides many examples of embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The present disclosure relates to formation and dissociation of gas hydrates to desalinate and/or treat saline or polluted water. During the formation process, when hydrates are formed out of saline or polluted water, they expel salts or other impurities, whereas, during the dissociation process, when the hydrates are dissociated, desalinated water is produced.

The present invention provides a system and method for desalinating water ranging from very low salinity to the maximum possible levels of salinity up to the eutectic saline composition under controlled temperature and pressure conditions. The present invention accomplishes desalination of such high and low salinity water and removal of other pollutants such as miscible liquids in an economically cost effective manner. The present invention also requires very low capital and operating cost to desalinate water and results in rapid conversion of water to hydrates and hydrates to water.

Few of the terms as used herein can be defined as below:

The terms "desalinated water" or "treated water" or "fresh water" as used herein, are used interchangeably and refer to water formed after removal of various salts and other pollutants or impurities present in saline or polluted water as defined herein below.

The terms "desalination" or "water desalination" or "water treatment" as used herein, are used interchangeably and refer to removal of various salts and other pollutants or impurities present in saline or polluted water as defined herein below.

The term "feed water" as used herein refers to the saline or polluted water to be desalinated/treated.

The terms "pollutants" or "contaminants" or "impurities" as used herein include organic or inorganic salts, other dissolved solids including such as organic matters, minerals etc. and miscible liquids including such as organic liquids, alcohols etc.

The terms "hydrate" or "Gas Hydrates" as used herein refer to ice-like, solid crystalline compounds formed of water molecules and gas molecules, in which each gas molecule is included inside a cage formed of hydrogen-bonded water molecules within a three-dimensional lattice structure.

The term "hydrate former" or "hydrate-forming gas" as used herein refers to a molecule or a compound which can form hydrates. The hydrate former, in the present system, can be stored in any form, for example, as gas, as liquid or as hydrates. The hydrate former can include $C_1$-$C_5$ hydrocarbons such as methane, ethane, propane and the like, $CO_2$, $O_2$, $H_2$, $N_2$, $H_2S$, inert gases such as Ar, Kr or Xe and the like, and mixtures thereof.

One method of desalinating or treating saline/polluted water according to an aspect of the present invention comprises the following steps:
  pumping feed water into a desalination tank from a feed water tank;
  forming gas hydrates in the desalination tank using hydrate former and microbubbles of the hydrate former;
  discharging concentrated saline water and crystallized solids from a bottom outlet of the desalination tank to a highly saline water tank and a salt collection sump respectively;
  washing the gas hydrates to remove surface salt; and
  dissociating the gas hydrates to give desalinated or treated water
wherein all the above steps are carried out in a single desalination tank.

In an embodiment of the present invention, the proposed apparatus comprises a desalination tank configured to form gas hydrates using a hydrate former taken from a storage tank that is operatively connected to the desalination tank. The desalination tank can further be configured to discharge the remaining concentrated saline water formed after the formation of the gas hydrates through a suitable outlet and to wash the gas hydrates to remove surface salt. The desalination tank can further be configured to allow dissociation of the gas hydrates to give desalinated/treated water and the hydrate former, wherein the hydrate former can be returned back to the storage tank for storage and further use. With all operations, including formation of the gas hydrates, discharging of the highly saline water, washing of the gas hydrates, and dissociation of the gas hydrates, being conducted in a single desalination tank, the present apparatus provides a simple and efficient solution at a low manufacturing and operating cost.

The present invention can be run in multiple stages with each stage processing a suitable amount of feed water so as to produce manageable quantities of gas hydrates. The desalination system of the present invention preferably is a batch process. Unlike most of the other known gas hydrate desalination methods, which use multiple vessels and separate processes, the system of the present invention uses a single vessel to accomplish all of the process steps associated with gas hydrate desalination including formation of gas hydrates, discharging of highly saline water, washing the gas hydrates, and dissociation of gas hydrates, which requires minimum capital, operating and maintenance costs. In addition, all of the separate process steps of the present invention can be integrated into a seamless process that rapidly proceeds from beginning to end without interruption.

General construction of the apparatus for desalinating or treating saline or polluted water according to the present invention will be described herein below with reference to FIGS. 1 to 9.

FIG. 1 illustrates a first embodiment of the gas hydrate based desalination and/or water treatment system, wherein apparatus 100 is used for conducting the proposed desalination or water treatment method. Apparatus 100, as shown in FIG. 1, includes a desalination tank 110, a storage tank 102, a hydrate former in gaseous state 104, a connecting pipe 138, hydrate former in liquid state 160, hydrate former in gaseous state at a suitable pressure 106, a feed water tank 130, a feed water pump 118, a microbubble generator nozzle 116, pipe 140, a microbubble pump 114, gas hydrates 108, remaining concentrated saline water 112, water outlet line 154, fresh water tank 128, hydrate washing system 162, and concentrated saline water tank 126.

Figure 2:
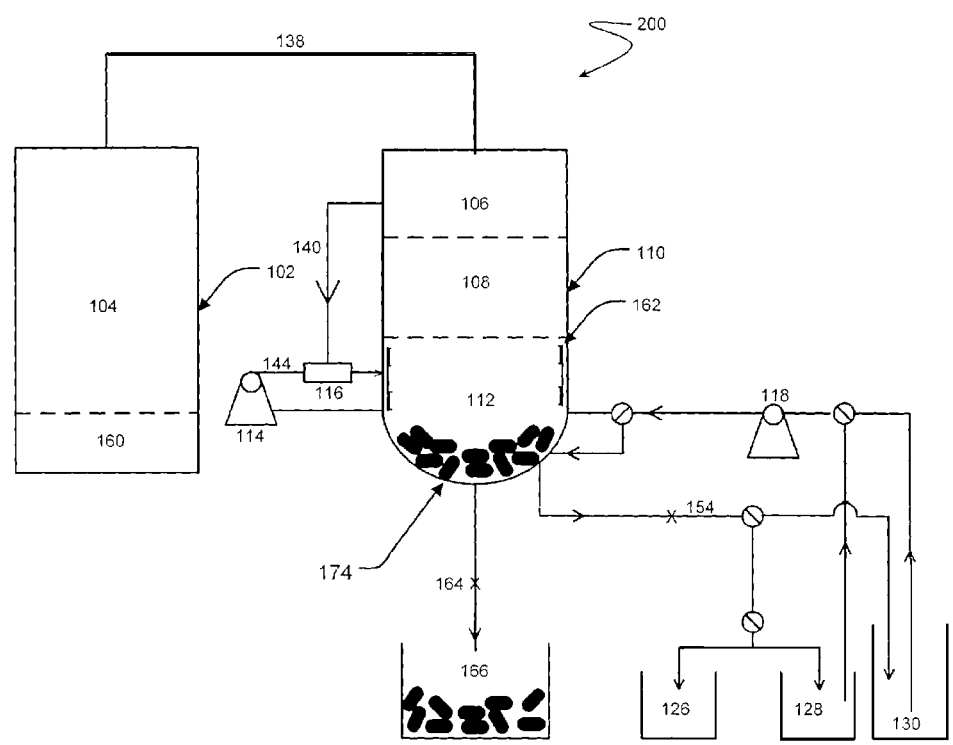
FIG. 2 illustrates a second embodiment of the gas hydrate based desalination and/or water treatment system with salt crystallization.

Vapour spaces 104 and 106 of the storage tank 102 and the desalination tank 110, respectively, can be operatively connected to each other through the connecting pipe 138 that allows free transfer of the hydrate former between the tanks as illustrated in FIG. 1 and FIG. 2, thereby constantly maintaining the pressure of both the tanks to a desired value. In an embodiment, the hydrate former can be stored in the liquid state 160 in the storage tank 102 at a suitable temperature and pressure and converted into gaseous form during the hydrate formation phase. In case the hydrate formers convert to hydrate from a liquid state, the hydrate formation conditions required are severe, making the hydrate formation process using the hydrate formers in liquid state more expensive than when these hydrate formers are in gaseous state during hydrate formation. At the same time, as large amounts of hydrate formers are required during hydrate formation, if they are stored in gaseous state, the size of storage tank 102 required would be very large, and therefore it is preferable to store these hydrate formers in liquid state. Therefore, it is preferable to store hydrate formers in liquid state and use them in gaseous state during hydrate formation.

The desalination tank 110 can contain the hydrate former in a gaseous state 106 at suitable temperature and pressure conditions. Suitable temperature and pressure conditions for the storage 102 and the desalination tanks 110 in the system of the present invention can depend on the hydrate former being used. For example, when the hydrate former used is ethane, it can be preferably stored in the storage tank 102 at a pressure 19 bars or lower and at a corresponding temperature at −9° C. or lower. Similarly, the desalination tank 110 can contain ethane in gaseous state at a pressure preferably below 19 bars and at a temperature below 16° C., more preferably below 15° C. In an embodiment, the apparatus 100 can be configured to work at a constant operating pressure below 19 bars, preferably 19 bars considering the same to be an optimum pressure when the hydrate former is ethane. However, the apparatus 100 can also be configured to operate at other pressures.

Figure 6:
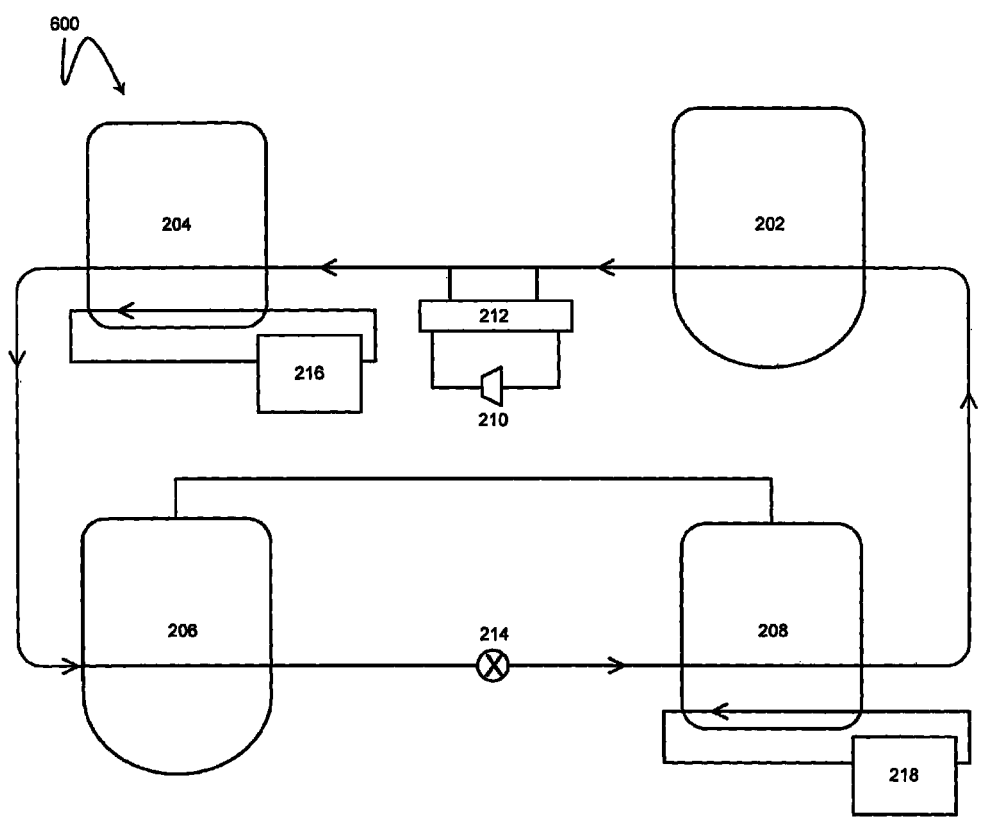
FIG. 6 illustrates a sixth embodiment of the gas hydrate based desalination and/or water treatment system having two thermally-coupled out of phase desalination systems, each comprising one desalination tank and one storage tank.

In an embodiment, the temperature in the storage tank 102 and the desalination tank 110 can be maintained using a suitable, separate, fast response temperature control system capable of rapidly supplying the maximum heating or cooling requirement, as will be described hereinafter in FIG. 6 and FIG. 7.

In a first step of the method of the present invention, feed water (saline water) is pumped from feed water tank 130 into desalination tank 110 through feed water pump 118. Furthermore, in addition to the feed water, space within the desalination tank 110 must also be configured such that it can accommodate a suitable increase in volume due to the formation of hydrates 108 in the subsequent step because the volume of the hydrates can generally be 20-30% greater than the volume of the water from which they are formed.

As the saline water level in the desalination tank 110 increases, more and more hydrate former in a gaseous state 106 is displaced from the desalination tank 110 and transported back into the storage tank 102 through the connecting pipe 138 where the hydrate former can be liquefied under suitable temperature, while maintaining a constant pressure in the storage tank 102 and in the desalination tank 110. Once a fixed amount of saline (feed) water is pumped into the desalination tank 110, the next step of the hydrate formation process is started.

In a typical gas hydrate formation step, in order to form gas hydrates, a sufficient amount of hydrate former needs to be dissolved into the feed water at a high pressure and low temperature. Microbubbles of the hydrate former can be dissolved in the feed water at a quantity much larger than the amount of corresponding hydrate former in gaseous form that is normally dissolved. In an embodiment of the invention, the gas hydrates can be formed from microbubbles of the hydrate former. Microbubbles are bubbles of gas of a size of a few microns which can be generated by using various kinds of microbubble generation systems such as venturi based microbubble generation systems and bell shaped microbubble generation systems. The hydrate formation process of the present invention can include generation of microbubbles in the feed water which will almost instantaneously generate hydrate nuclei by self-compression and collapsing (disappearance) of the microbubbles. The hydrate nuclei are formed due to the increasing internal pressure of the microbubbles, wherein the microbubbles have a long residence time in water and have a large specific area.

In an embodiment of the invention, gas hydrates can be formed from microbubbles of the hydrate former using a microbubble generator system. As illustrated in FIGS. 1 to 5 and FIGS. 8 to 9, the microbubble generation system can include a microbubble nozzle 116 and a microbubble generator pump 114 of suitable specifications, wherein the pump 114 can be configured to take saline/polluted water 112 from the desalination tank 110 and pump it through the nozzle 116, wherein the nozzle 116 is connected to vapour space 106 of the desalination tank through a pipe 140. Pumping of the water through the nozzle 116 can result in the formation of a low pressure region at the point of the connection of the nozzle 116 and the pipe 140 from the vapour space 106 of the desalination tank 110. This results in sucking of the hydrate former into the nozzle 116 and converting the hydrate former into microbubbles. Based on the design of the microbubble nozzle 116 and the specification of the microbubble pump 114, a specified amount of gas can be sucked into the nozzle 116 and converted into microbubbles of a specified size. These microbubbles can then be expelled along with pumped water into the desalination tank 110.

Microbubbles have a property of shrinking in size and increasing their internal pressure over time. Also, because of their very small size, they have a very long residence time in a water column. As microbubbles have a long residence time in the water column and attain high internal pressures during this time, conditions necessary for hydrate formation are fulfilled at the surface of the microbubbles of the hydrate former. The amount of hydrate former dissolved in the vicinity of the microbubbles in the saline water is significantly increased by self compression and collapsing (disappearance) of the microbubbles, which significantly increases the nucleation rate of the microbubbles. The microbubbles act as nucleation sites for hydrate formation. Large specific area and long residence time of the microbubbles contribute to their dissolution. The dissolved gas rapidly creates gas hydrate layers around the gas hydrate nuclei resulting in nucleated hydrates, which, with the addition of more hydrate former, grow in size and form larger crystals. The microbubbles of the hydrate-former are thus almost instantaneously converted to hydrates.

Figure 10:
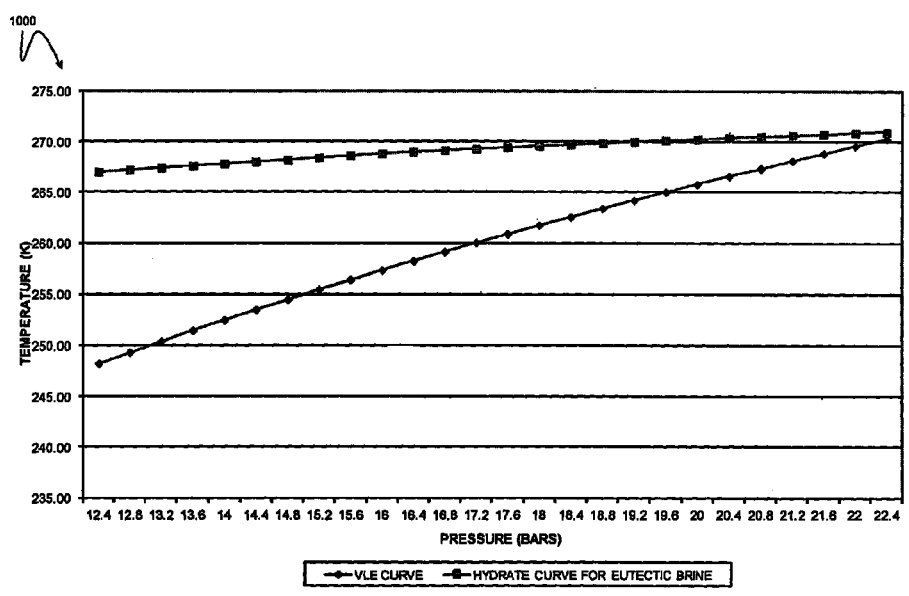
FIG. 10 illustrates a vapour-liquid equilibrium (VLE) curve and hydrate equilibrium curve with respect to eutectic NaCl solution for ethane.

Microbubbles of a particular hydrate forming gas are typically formed at a suitable temperature and pressure condition and are converted into corresponding gas hydrates at suitable conditions of pressure and temperature. FIG. 10 illustrates an exemplary vapor-liquid equilibrium (VLE) curve along with a hydrate equilibrium curve with respect to eutectic NaCl solution for ethane and Table 1 shows a desalination region of ethane as the hydrate former. Ethane can theoretically be stored at any temperature below 271 K (−2° C.). Accordingly, the operating pressure of both the tanks will lie on a VLE curve below 271 K (−2° C.). The equilibrium pressure corresponding to 271 K (−2° C.) is 22.4 bars.

Figure 11:
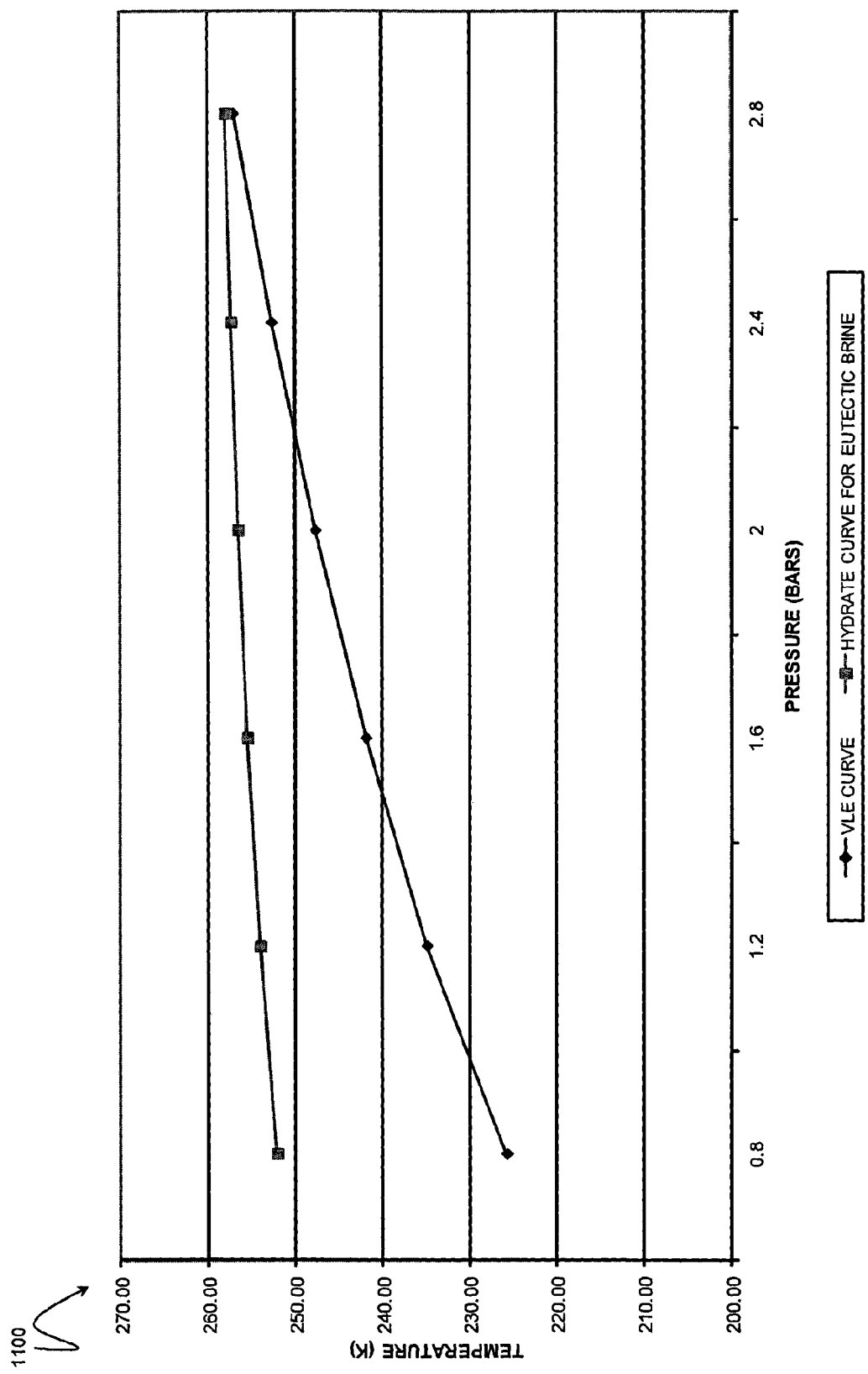
FIG. 11 illustrates a vapour-liquid equilibrium (VLE) curve and hydrate equilibrium curve with respect to eutectic NaCl solution for propane.
Figure 12:
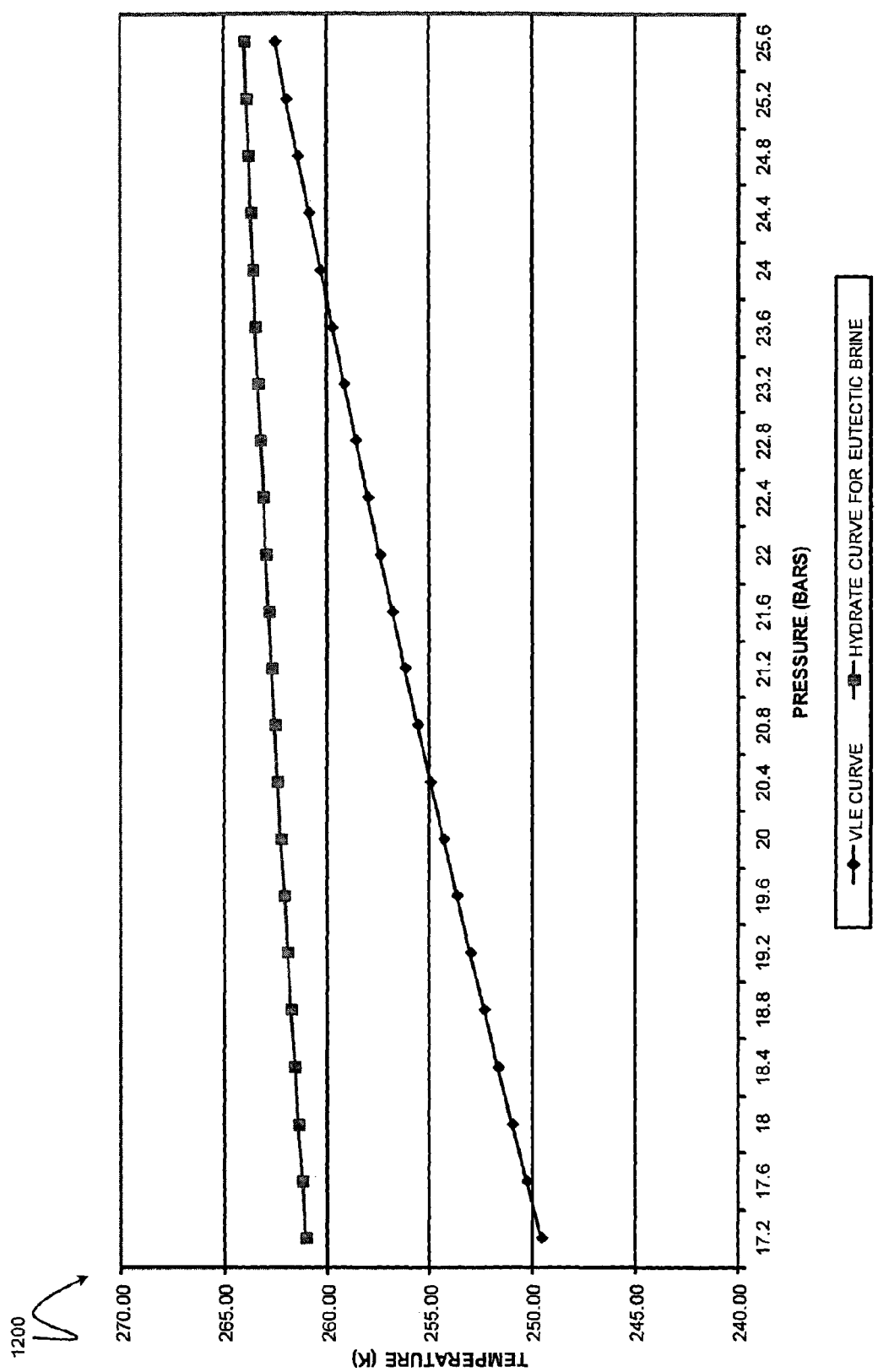
FIG. 12 illustrates a vapour-liquid equilibrium (VLE) curve and hydrate equilibrium curve with respect to eutectic NaCl solution for Carbon-dioxide ($CO_2$).

In one exemplary embodiment of the present invention, microbubbles of ethane can be formed at a pressure lower than the liquefaction pressure of ethane of 22.4 bars at a minimum hydrate formation temperature of around −3° C. in the desalination tank 110. It can be preferred to have an operating pressure of 19 bars, which is lower than 22.4 bars so that the microbubbles can be converted to gas hydrates before their internal pressure exceeds 22.4 bars even at the minimum hydrate formation temperature of −3° C. in the desalination tank 110. In one of the preferred embodiments, the temperature corresponding to the pressure of 19 bars in the desalination tank 110 and the storage tank 102 can be 270 K (−3° C.) and 264 K (−9° C.) respectively. Similar desalination region curves can also be prepared for other hydrate formers. However, the pressure and temperature conditions for other hydrate formers can be more severe. For example, for Propane as hydrate former, the operating pressure is 1 bar, the temperature in the storage tank is 230 K and minimum temperature in desalination tank in case of propane stored in liquid form is 253 K, as shown in FIG. 11 and Table 2. Similarly for $CO_2$ as hydrate former, the operating pressure is 20 bars, the temperature in the storage tank is 254 K and minimum temperature in desalination tank in case of $CO_2$ stored in liquid form is 262 K, as shown in FIG. 12 and Table 3. In one embodiment of the present invention, in case of methane, a high operating pressure of 90 bars with a minimum temperature of 270 K in the desalination tank is required with methane being stored in supercritical gas form in the storage tank which will further require suitable variations in operating methods like operating the present invention with continuously varying storage tank pressure. These severe pressure and temperature conditions may require costlier infrastructure and operations to maintain. Thus, in an embodiment of the present invention, ethane is a preferred gas for desalinating water up to its eutectic composition and further crystallizing salt from eutectic saline, though the system and method of the present invention can be operated with other hydrate formers.

TABLE 1

Desalination Region - Ethane

| Pressure (Bars) | Ethane Liquefaction Temperature (K) (Using Peng-Robinson Cubic equation of state) | Ethane Hydrate Dissociation Temperature For Eutectic Brine (K) (Using CSMHYD software) |
| --- | --- | --- |
| 12.8 | 249.34 | 267.2 |
| 14 | 252.49 | 267.8 |
| 15.2 | 255.45 | 268.4 |
| 16.4 | 258.24 | 269 |
| 17.6 | 260.89 | 269.43 |
| 18.8 | 263.41 | 269.85 |
| 20 | 265.82 | 270.25 |
| 21.2 | 268.12 | 270.625 |
| 22.4 | 270.33 | 271 |

TABLE 2

Desalination Region - Propane

| Pressure (Bars) | Propane Liquifaction Temperature (K) (Using Peng-Robinson Cubic Equation of state) | Propane Hydrate Dissociation Temperature For eutectic brine (K) (Using CSMHYD software) |
| --- | --- | --- |
| 0.8 | 225.72 | 252.10 |
| 1.2 | 234.91 | 254.00 |
| 1.6 | 241.95 | 255.50 |
| 2 | 247.73 | 256.50 |
| 2.4 | 252.69 | 257.30 |
| 2.8 | 257.04 | 257.90 |

TABLE 3

Desalination Region - $CO_2$

| Pressure (bars abs.) | $CO_2$ Liquifaction Temperature (K) (Using Peng-Robinson Cubic Equation of state) | $CO_2$ Hydrate Dissociation Temperature for eutectic brine (K) (Using CSMHYD software) |
| --- | --- | --- |
| 17.2 | 249.56 | 261.05 |
| 18.4 | 251.67 | 261.60 |
| 19.6 | 253.67 | 262.10 |
| 20.8 | 255.59 | 262.55 |
| 22 | 257.42 | 262.97 |
| 23.2 | 259.18 | 263.35 |
| 24.4 | 260.88 | 263.69 |
| 25.6 | 262.51 | 264.00 |

In an embodiment, outlet pipeline 144 of the microbubble pump 114, connecting the pump 114 to the microbubble nozzle 116, can be heated, which can prevent the conversion of ethane microbubbles to hydrates inside the microbubble nozzle 116 or within the outlet pipeline of the microbubble pump 114.

Once the saline water is pumped into the desalination tank 110, the desalination tank 110 is at a specific constant pressure and at a specific temperature (depending on the hydrate former used). At this point, the microbubble generation system can be started and the temperature of the desalination tank 110 can be decreased. As increasing amounts of microbubbles of the hydrate former are formed using the gas sucked from the vapour space 106 of the desalination tank 110, a similar volume of the gas 104 is transferred from the storage tank 102 to the desalination tank 110 due to the decrease in the pressure of the desalination tank 110, which helps keep the pressure of the complete system constant. This results in a decrease in the level of liquid hydrate former 160 in the storage tank 102. As the temperature of the desalination tank 110 decreases, increasing amounts of microbubbles of the hydrate former convert into gas hydrates 108. Formation of increasing amounts of gas hydrates 108 results in an increase in the salinity of the remaining water 112 in the desalination tank, as when hydrates form out of saline or polluted water they expel the salt or the pollutants present in the saline water from which they are formed. Increased salinity further requires lower temperatures to form gas hydrates out of microbubbles. Thus, continuous formation of microbubbles along with continuously decreasing temperatures result in increased formation of gas hydrates out of saline water of increasing salinity.

Figure 3:
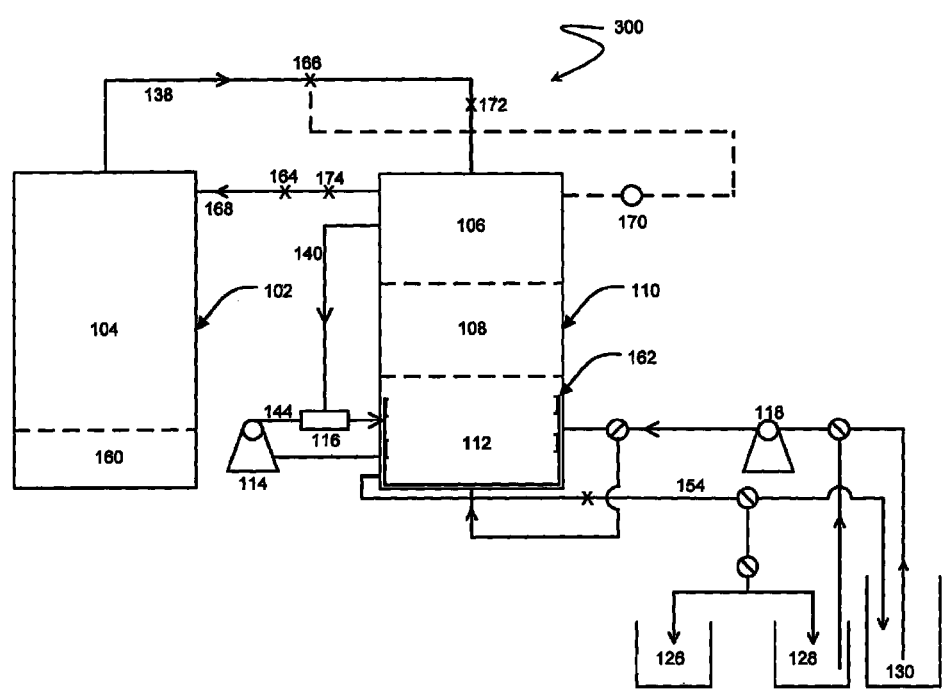
FIG. 3 illustrates a third embodiment of the gas hydrate based desalination and/or water treatment system configured to control pressure between the storage tank and the desalination tank.
Figure 4:
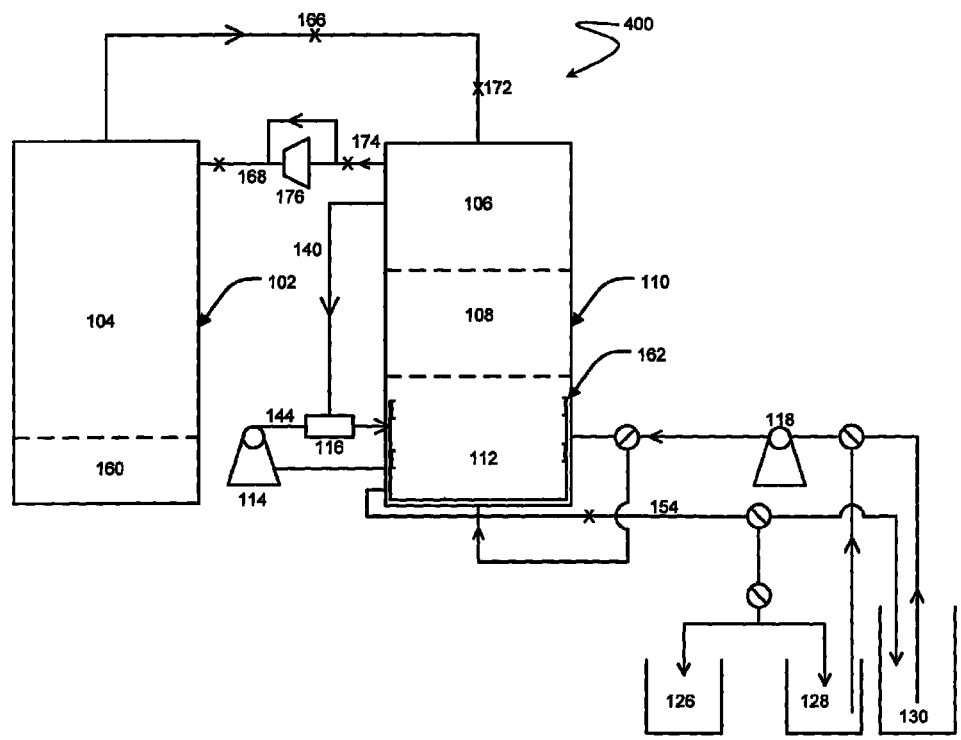
FIG. 4 illustrates a fourth embodiment of the gas hydrate based desalination and/or water treatment system configured to control the pressure between the storage tank and the desalination tank.
Figure 5:
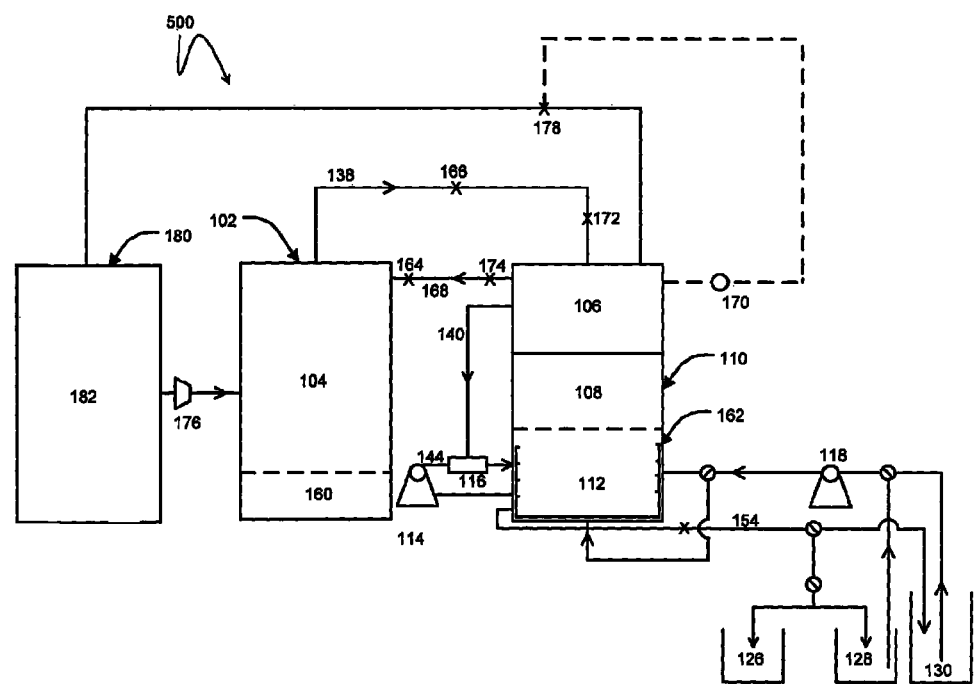
FIG. 5 illustrates a fifth embodiment of the gas hydrate based desalination and/or water treatment system configured to control the pressure between the storage tank and the desalination tank.

In one embodiment of the invention as shown in FIG. 3, FIG. 4 and FIG. 5, the storage tank 102 can be maintained at a pressure higher than that of the desalination tank 110. Here the desalination tank 110 and the storage tank 102 can be connected through a depressurization pipe 168, wherein the depressurization pipe 168 can be operatively coupled to a non-return valve 164, allowing unidirectional flow of the hydrate former from the desalination tank 110 to the storage tank 102. This maintains the pressure in the desalination tank 110 and does not allow the pressure to exceed a higher pressure of (for example 24 bars) in the desalination tank 110, while gas is being transferred from the desalination tank to the storage tank. This pressure depends on the temperature of the storage tank containing liquid hydrate former and is the vapour-liquid equilibrium pressure corresponding to the temperature of the storage tank (for example 24 bars at 0 C). Also, connecting pipe 138 has a pressure control valve 166, which does not allow the pressure of desalination tank to fall below a minimum pressure of 19 bars while gas is being transferred from the storage tank to the desalination tank. In a further embodiment (not shown), the depressurization pipe 168 can be connected with the non-return valve 164 from either end to the connecting pipe 138 at an upstream and downstream side, of the pressure control valve 166 instead of being directly connected to the storage tank 102 and the desalination tank 110.

With reference to FIG. 3, FIG. 4 and FIG. 5, when ethane is used as a hydrate former, and as the level of saline water level in desalination tank 110 increases, more and more ethane 106 can be displaced from the desalination tank 110 and transferred back into the storage tank 102 through the depressurization pipe 168, where the gas can be liquefied at a temperature 0° C., maintaining the pressure of the storage tank 102 at 24 bars. In case the microbubble generation system can be optimized to work at a variable pressure higher than optimized operating pressure for hydrate formation in desalination tank (desalination tank set pressure) then once a fixed amount of saline water has been pumped into the desalination tank 110, the microbubble generation system can be started. It converts the excess gas to microbubbles and which are further converted to hydrates by continuously decreasing the temperature of the desalination tank. The conversion of excess gas to hydrates result in decrease in the pressure of desalination tank till the pressure of 19 bars is attained. Any further conversion of gas to hydrates results in transfer of gas from storage tank 102 to desalination tank 110 which maintains the pressure of desalination tank at 19 bars. In case microbubble generation system cannot work at variable pressures higher than 19 bars then the temperature of the storage tank 102 can be decreased momentarily to −9° C. This decreases the pressure of the storage tank 102 to 19 bars, which is the vapour liquid equilibrium pressure of ethane at −9° C. Thus, the ethane gas from the desalination tank 110 which is at 24 bars pressure can be transferred to the storage tank 102 through the depressurization pipe 168 where it is liquefied resulting in decrease of pressure of the desalination tank to 19 bars. After the momentary decrease of the temperature of the storage tank to −9° C. which results in excess gas from the desalination tank 110 to be transferred to the storage tank 102, the temperature of the storage tank 102 can be increased again to 0° C., resulting in an increase in the pressure of storage tank 102 to 24 bars. Non-return valve 164 can be configured in the depressurization pipe 168 which will not allow any backflow of ethane gas from the storage tank 102 to the desalination tank 110 due to the increase in storage tank pressure due to temperature rise from −9° C. to 0° C.

In another embodiment, a compressor 176 can be configured in the depressurization pipe 168, wherein the compressor 176 can be operatively coupled to the non-return valve 164. The compressor 176 can be used to transfer excess gas from the desalination tank 110 to the storage tank 102, thus avoiding the requirement of a momentary decrease in storage tank temperature as shown in FIG. 4.

In another alternate embodiment, as shown in FIG. 5, excess gas 182 can be collected in an excess gas collection tank 180 for a few desalination cycles (such as for 6-10 cycles) and finally transferred to storage tank 102 using a suitable compressor 176 of higher flow rate. Subsequent to this, the hydrate formation process can be started.

As the salinity of water increases due to gas hydrate formation, the temperature required for further hydrate formation can be lowered. This is due to the fact that the salt in the saline water can act as a hydrate inhibitor, making hydrate formation increasingly more difficult as the increasing salinity of the remaining saline water 112 inhibits increased hydrate formation.

According to another exemplary embodiment, when the hydrate former is ethane, set temperature in desalination tank 110 can be lowered to −2 to −5° C. and preferably −3° C., at which the maximum possible desalination of saline water can take place, producing highly saline water with maximum possible eutectic salinity level of around 23%. In an exemplary embodiment, when the hydrate former is ethane, temperature of storage tank 102 can be maintained at −9° C. during the complete ethane hydrate formation process.

In one embodiment, the microbubble generation system can be stopped or configured to run intermittently as desired for efficient desalination or water treatment depending on parameters or conditions such as temperature, pressure, amount of gas hydrates, amount of concentrated saline water in the desalination tank 110, among other such parameters. For instance, the microbubble generation system can be stopped once when about 50% of the feed water has been converted into gas hydrates. At this point, the maximum amount of gas hydrates 108 that can be formed from 50% of the saline feed water, remains in the desalination tank 110, and the highly concentrated saline water 412, which is at increased salinity, which can be up to the maximum possible eutectic salinity of around 23% salt, is present at the bottom of the desalination tank 110.

According to one embodiment, in the case of low salinity feed water, when the system is operated in multiple stages and stopped at an intermediate stage or at an intermediate concentration lower than the maximum eutectic concentration of around 23%, the desalination tank 110 may not be cooled to the lowest set temperature corresponding to the maximum eutectic concentration of around 23% at the constant operating pressure of the system but instead, may be cooled to a temperature higher than this value.

Figure 13:
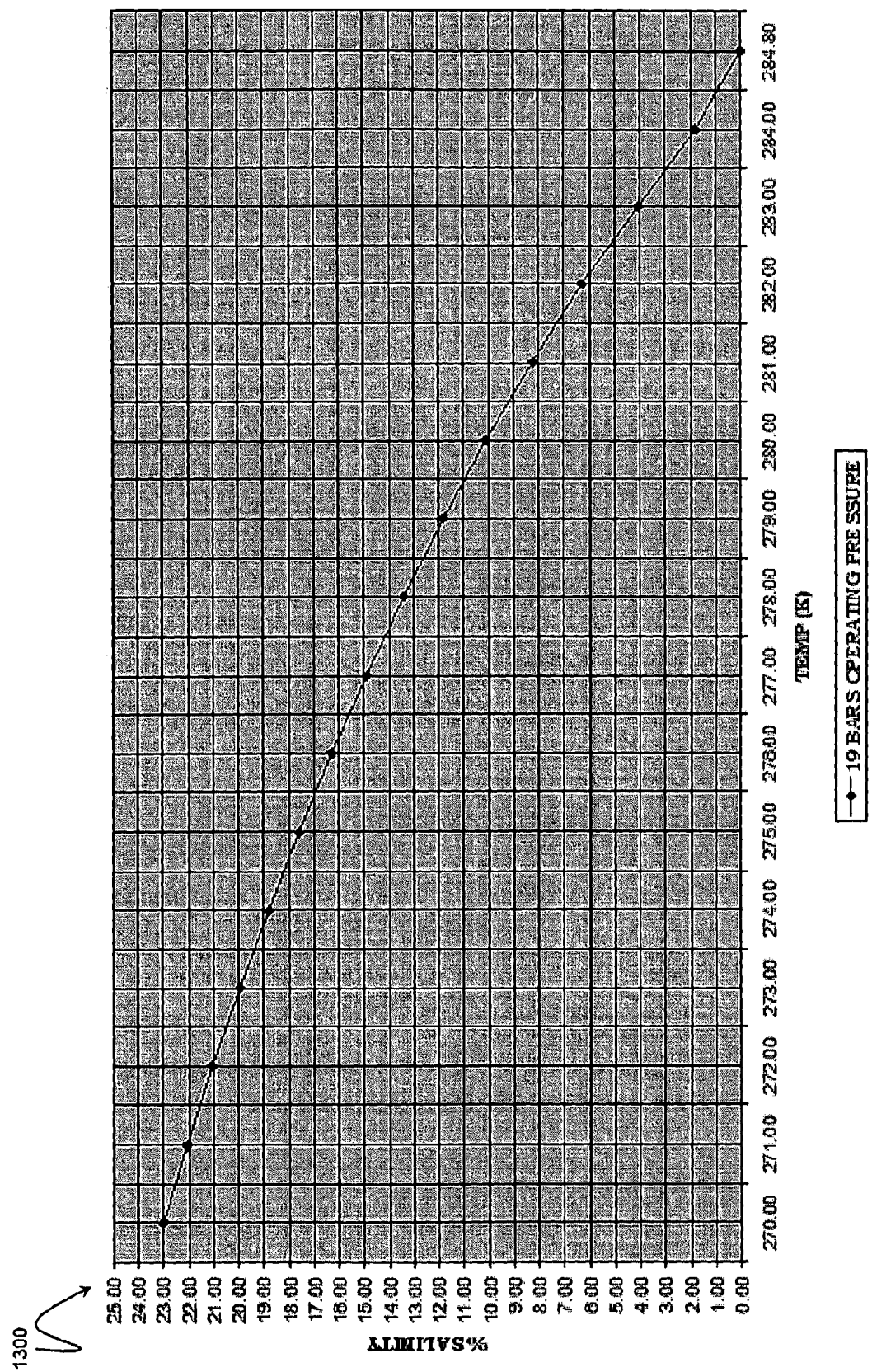
FIG. 13 illustrates a variation of "percentage salinity" of concentrated saline water versus hydrate equilibrium temperature at 19 bars pressure for ethane.

In another embodiment, with reference to FIG. 13, the variation of the percentage of salinity of concentrated saline water produced using ethane as the hydrate former, operating at a constant pressure of 19 bars with the new set temperature, shows that, as and when the temperature increases, the salinity of the concentrated saline water produced by the system decreases. The value of the new set temperature at an operating pressure of 19 bars can be found corresponding to the final percentage of the salinity of the concentrated saline water desired by the system or at any stage of the system using the graph shown in FIG. 13.

In one aspect of the invention, eutectic saline water can be further processed to provide for the crystallization of the salt and removal of salt crystals formed in the desalination tank 110, resulting in almost complete recovery of desalinated/fresh water from saline water. FIG. 2 illustrates a second embodiment of the gas hydrate based desalination and/or water purification system with salt crystallization.

In another embodiment as shown in apparatus 200 of FIG. 2, salt crystals 174 can be present in the desalination tank 110 along with highly concentrated saline water 112, which can be at the maximum possible eutectic salinity of around 23% salt and below −3 C temperature.

Apparatus 200 can further be comprised of a suitable taper (not shown) at the bottom of desalination tank 110, which can result in the collection of heavier salt crystals 174 at the bottom of the desalination tank 110. These salt crystals 174 can be removed from the desalination tank 110 by opening a salt crystal removal valve 164 and collecting the salt crystals 174 in a salt crystal sump 166.

In most of the existing desalination systems, saline water is transferred to a separate salt crystallizer. However, the present invention provides for crystallization of the salt in the same tank 110, thus resulting in a substantial saving in capital cost.

In an aspect of the present invention, for desalination tank 110 to act as a salt crystallizer, either a conical bottom or a round bottom can be used. The conical or round bottom can be coated with a non-stick corrosion resistant coating to prevent the salt crystals from sticking to the bottom. Using the round bottom (as shown in FIG. 2) can be advantageous as it is cheaper and can also contain more volume of water. The round bottom can thus be more cost-effective and suited for vehicle (truck) based mobile desalination systems, where limitations on height of the desalination system exist.

Once gas hydrates 108 have been formed using the microbubble generation system, concentrated saline water 112 can be removed from desalination tank 110 through an outlet at the bottom of the tank 110 using a water outlet line 154. A suitable filter can be placed in the water outlet line 154 so as to not allow even the smallest amount of gas hydrate particles 108 to escape, resulting in no loss of the gas hydrate particles 108 from the system. In one embodiment, a small amount of concentrated saline water 112 can be left inside the desalination tank 110 so as to act as a liquid seal preventing the hydrate former 106 from escaping from the water outlet line 154.

Concentrated saline water removal from the bottom of desalination tank 110 results in the receding of the water column, which can make the gas hydrates, which are floating on top of the water column in the form of slurry, also recede, causing hydrate former 106 to flow from storage tank 102 into the desalination tank 110 through connecting pipe 138 as illustrated in FIG. 1. This can maintain the pressure in the desalination tank 110 at the operating pressure of the system and prevent the gas hydrates 108 from dissociating. Unobstructed free transfer of the hydrate former between the two tanks can be used in the subsequent steps of hydrate-washing and removal of desalinated water as described hereinafter.

Once concentrated saline water 112 has been removed from the desalination tank 110, low salinity water can be taken from the fresh water tank 128 and pumped using the feed water pump 118 into the hydrate washing system 162 at a high temperature (for example 20C). The hydrate washing system 162 can include a plurality of small nozzles (not shown) located at a lower portion of the desalination tank 110 from where fresh water can be sprayed into the gas hydrates 108 resulting in the washing of the salts from the surface of the hydrates 108. The hydrate wash water can then be taken out of the water outlet line 154 and passed into the feed water tank 130. Hydrate washing can be carried out a number of times until the hydrates are washed completely and salinity of expelled hydrate wash water becomes very low. At this point, the completely washed hydrates are present in the desalination tank 110.

It would be appreciated that the present disclosure is only an exemplary implementation of the apparatus 100, many more modifications or structural changes can be implemented to process the gas hydrates, the concentrated saline water, or even the hydrate former. For instance, multiple water outlet lines or pumps can be created for taking out fresh water from the fresh water tank 128, taking out saline water from the desalination tank 110, taking out wash water from the desalination tank 110, among other such changes. In another instance, a separate pump from the feed water pump 118 can be used for taking fresh water from the fresh water tank 128 for washing of the gas hydrate 108.

Even during the pumping of a fresh batch of the saline feed water into the desalination tank 110, or during switchover from one desalination cycle to the next, the desalination tank 110 may not be isolated from the storage tank 102, resulting in the pressure being maintained in the desalination tank 110 while the level of feed water is increasing. Exceeding water levels in the desalination tank 110 can result in the free transfer of the hydrate former from the desalination tank 110 to the storage tank 102 without the use of the isolation valves (as shown in FIG. 1) where the gas can get condensed, thereby increasing the level of liquid hydrate former 160 in the storage tank 102. This can make the system extremely simple in structure and function since the system may not require any control system for maintaining flow or pressure. Isolation of the two tanks 102 and 110 may only be required during maintenance of desalination tank 110.

Once the gas hydrates 108 have been washed, the next step of the hydrate dissociation process can be carried out by increasing the set point of the temperature control system to the hydrate dissociation temperature of the hydrate former. The increase in the set point of temperature results in the dissociation of the gas hydrates 108 and release of the hydrate former 106 and desalinated water. For instance, when the hydrate former is ethane, the set point of the temperature control system can be increased to 12-13° C., which is the hydrate dissociation temperature at 19 bars pressure for ethane. Once the hydrate former and desalinated water have been formed, the hydrate former can be transferred to the storage tank 102, where the temperature is being maintained at −9° C. resulting in liquefaction of the hydrate former. It is to be noted that the hydrate formation process is an exothermic process, whereas, the hydrate dissociation process is an endothermic process.

Finally, the gas hydrates can be dissociated completely and the resulting desalinated water can remain in the desalination tank 110. Desalinated water can be removed from desalination tank 110 through water outlet 154 and passed into the fresh water tank 128. In another embodiment, some amount of desalinated water can be left inside the desalination tank 110 to act as a liquid seal preventing gas 106 from escaping from the water outlet 154.

Desalination tank 110, after the hydrate dissociation step, is at its initial pressure and initial temperature and contains very little desalinated water. After the dissociation step, the hydrate former has also been completely transferred to storage tank 102, which is also at its initial conditions with the same level of liquid hydrate former 160 in it as when the process started. The system is ready to start the next desalination cycle/stage.

In one embodiment of the present invention, in accordance with FIG. 1, gas hydrates 108, formed during the hydrate formation phase of a desalination cycle, can be dissociated at the same operating pressure at which they were initially formed by increasing the temperature of the desalination tank. The hydrate former can be stored in the form of hydrates during hydrate formation accompanied with vaporization of ethane liquid from storage tank 102. Also gas trapped in the hydrates can be released at high pressure and immediately transferred to storage tank 102, where the gas can be liquefied and stored. Thus, gas hydrates, when formed, act likes an expander and when dissociated, act likes a compressor resulting in immediately transfer gas from one tank to the other. This keeps the operating pressure constant at the vapour liquid equilibrium pressure of the hydrate former, which corresponds to the constant operating temperature of the storage tank 102. Thus, the present disclosure can eliminate the need for an expander or a compressor, which results in substantial savings of both capital and energy.

The present disclosure is also capable of desalinating/treating saline water ranging from low salinity to the maximum possible levels of salinity in water. In case of desalination of high salinity water, the system can be run in a single stage. For desalinating low salinity water and discarding highly concentrated brine, the same system may be needed to be run in multiple stages.

In another embodiment of the present invention, the combined arrangement of connecting pipe 138 with pressure control valve 166 and depressurization pipe 168 with non-return valve 164, as shown in FIG. 3, can maintain the pressure of desalination tank 110 at a lower set pressure of the system (for example 19 bars) to be maintained during the hydrate formation phase and an upper set pressure (for example, 24 bars) to be maintained during the hydrate dissociation phase. Temperatures in both storage tank 102 and desalination tank 104 can be maintained using suitable, separate, fast response temperature control systems capable of rapidly supplying the maximum heating or cooling requirement.

It can well be understood that in the present invention the pressure control valve 166, the depressurization pipe 168, the non-return valve 164, and the connecting pipe 138 between the storage tank 102 and the desalination tank 110 (FIG. 3, FIG. 4 and FIG. 5) is equivalent to and can be replaced by a single connecting pipe 138 with no pressure or flow control system between the storage tank 102 and the desalination tank 110 (FIG. 1 and FIG. 2) under the condition that the storage tank 102 is maintained at a pressure equal to the optimized operating hydrate formation pressure of the desalination tank 110. This can allow free transfer of gas from one tank to the other depending on the pressure of the tanks, thereby requiring no flow control system or pressure control system between the two tanks, as described hereinabove and as illustrated in FIG. 1 and FIG. 2. In such a system, the storage tank temperature can be maintained at a value corresponding to when the liquefaction pressure of the hydrate former is equal to the optimized operating pressure of the desalination tank 110. In an exemplary embodiment, the storage tank temperature value for a system having ethane as the hydrate former and operating at the optimum pressure of 19 bars, can be −9° C. Further, when pressure of the storage tank 102 becomes lower than constant hydrate formation pressure of desalination tank 110, the system can adjust itself and operate in its most simple form as illustrated in FIG. 1 and FIG. 2 but at a new constant pressure equal to the new pressure of storage tank 102. This can be subject to the condition that the microbubble generation system operates effectively at this new lower pressure. The new lower operating pressure can require suitable decrease in minimum desalination tank temperature required for attaining eutectic composition in the concentrated saline water.

In another embodiment of the present invention and as illustrated in the FIGS. 1 to 9, a suitable system of two-way valves can be used to enable the same feed water pump 118 to be used for multiple tasks including but not limited to, for example, pumping feed water into the desalination tank 110 and pumping desalinated water into the hydrate washing system 162. A similar arrangement can also enable the use of the same water outlet nozzle to deliver desalinated water to the fresh water tank 128, concentrated saline water to concentrated saline water tank 126, and hydrate wash water to feed water tank 130.

In another embodiment, the apparatus of the present disclosure can be designed for a variable storage tank pressure selected from within a range of pressures by replacing pressure control valve 166 that works on a constant differential pressure as described hereinabove by a more complex pressure control valve that works by sensing the pressure in the desalination tank 110 through a pressure transmitter 170 as shown in FIG. 3. This pressure control valve 166 only opens when it senses the pressure in the desalination tank to be below the optimized operating pressure of desalination tank (desalination tank set pressure) during hydrate formation which is 19 bars in case of ethane. As mentioned herein above, the present invention can start working in its most simple form when the storage tank pressure equals or becomes lower than the desalination tank set pressure. Different storage tank pressures equal to or lower than the desalination tank set pressure require different minimum desalination tank temperatures to attain the maximum possible salt concentration in the concentrated saline water at these pressures.

The present disclosure can work effectively at a storage tank pressure higher than optimized operating pressure of desalination tank (desalination tank set pressure) when hydrate former is stored in liquid form by the transfer of excess gas to the storage tank 102, either exclusively through a compressor (such as 176 of FIG. 4), or exclusively by momentary dip in the temperature of the storage tank 102, or exclusively by conversion of excess gas to hydrates by using a suitable microbubble generation system capable of operating in a wide range of pressures; or by a suitable combination of these or other methods of transfer and conversion of excess gas.

All embodiments of the present invention and similar obvious variants can also operate with hydrate former being stored in gaseous form by suitable variations in operating methods of the present invention like operating the present invention for a continuously varying storage tank pressure.

In an embodiment, when concentrated saline water or hydrate wash water or desalinated water is being removed from the bottom outlet of desalination tank 110, some amount of water is left in the tank 110 so as to act as a liquid seal and prevent the hydrate former from escaping from the bottom outlet. In implementation, it may therefore be required to know the level of saline water or hydrate wash water below the floating hydrates in the desalination tank 110.

In an embodiment, two thermally coupled out of phase desalination systems can be used instead of a single stand-alone desalination system as described herein above. In such a system of the present invention as shown in apparatus 600 of FIG. 6, heat from one system operating in hydrate formation mode can be transferred to the other system operating in hydrate dissociation mode using a refrigerant along with a refrigerant compressor 210 and using an expansion valve 214. The same temperature control system can be operated in reverse by installing a four-way valve 212, thus making the temperature control system work as a heat pump. A single temperature control system can be used for two desalination systems in accordance with the present invention. In apparatus 600, when one of the desalination systems comprising a desalination tank 1 202 and a storage tank 1 204 is in the hydrate formation phase, the other desalination system comprising a desalination tank 2 206 and a storage tank 208, can be in the hydrate dissociation phase. In an embodiment of the invention, the heat pump based temperature control system as described in apparatus 600 includes a refrigerant compressor 210 and a four way flow reversal valve 212, is configured to be placed between the desalination tank 1 202 and the storage tank 1 204. An expansion valve 214 can be configured to be placed between desalination tank 206 and the storage tank 2, also referred to as the hydrate former tank 2 208.

In one embodiment, propane can be used as the refrigerant due to its excellent thermo-physical properties and non-ozone depleting characteristics. Any other heat pump fluid capable of providing the required heating and cooling loads and temperatures can also be used at different flow-rates and pressures in the integrated temperature control system of the present invention.

As the same quantities of heat are being released and utilized during the hydrate formation and dissociation phases and as the same amounts of hydrates are being formed and dissociated in both the desalination systems, the heat released in one of the desalination tanks and utilized in the other desalination tank at any point in time is also equal. Also, when heat is being released in one desalination tank, a lesser amount of heat is utilized in the connected hydrate former tank due to gas vaporization. For instance, when heat is being released in the storage tank 2 208 and the desalination tank 1 202, the same amount of heat is being utilized in the storage tank 1 204 and the desalination tank 2 206 respectively. Placement of the compressor 210 between the desalination tank 1 202 and the storage tank 1 204 and placement of the expansion valve 214 between the desalination tank 2 206 and the storage tank 2 208 can result in the separation of the tanks of the two desalination systems into the ones that release heat or the ones that utilize heat at any particular time. A suitable flow-rate of the refrigerant and its inlet and outlet pressures can provide such temperatures, upstream and downstream of the compressor 210 and the expansion valve 214 that the required heating and cooling to various tanks can be maintained. A four-way flow reversal valve 212 can be configured to reverse the flow of the refrigerant when the hydrate formation phase ends and the hydrate dissociation phase starts in one of the desalination systems. This heat pump based temperature control system results in an extremely low capital cost requiring just a refrigerant compressor 210, expansion valve 214, and a four-way flow reversal valve 212 and also offers an extremely low operating cost solution for the working of two thermally coupled out of phase desalination systems. Any heat loss/gain due to ambient temperatures can be compensated by putting chillers/freezers 216 and 218 in storage tank 1 and storage tank 2.

Figure 7:
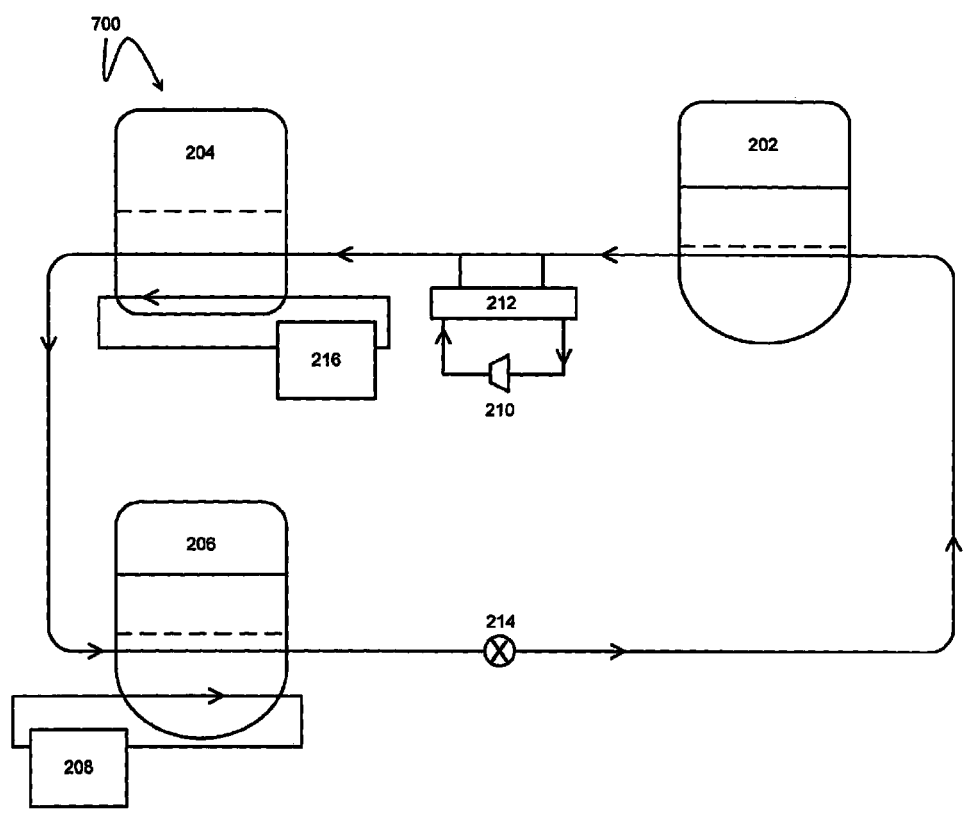
FIG. 7 illustrates a seventh embodiment of the gas hydrate based desalination and/or water treatment system having one desalination system thermally coupled with an out of phase tank having water and ice.

Alternatively, in another embodiment, as shown in FIG. 7, one desalination system comprising one desalination tank 202 and one storage tank 204 can be thermally coupled with a tank containing water and ice 206 operating out-of-phase with the desalination system. When hydrate formation takes place in the desalination system, comparable amounts of ice melts in the thermally coupled tank containing ice and water and vice-versa. The comparable latent heat of ice and hydrates results in the effective thermal coupling between desalination tank on one side and the storage tank and the tank containing ice on the other side. Any heat loss/gain due to ambient temperatures can be compensated by putting chillers/freezers 216 and 208 in the storage tank and the ice tank.

Figure 8:
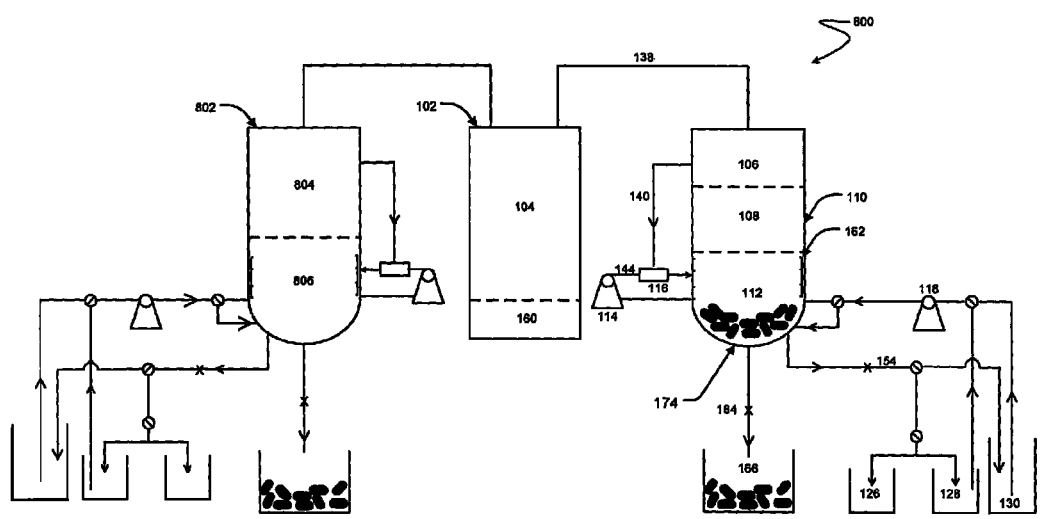
FIG. 8 illustrates eighth embodiment of the gas hydrate based desalination and/or water treatment system having two out-of-phase desalination tanks connected to one storage tank.

In another embodiment illustrated in FIG. 8, two out-of-phase desalination tanks 110 and 802 can be operatively coupled with storage tank 102. In implementation, as these desalination tanks 110 and 802 are out of phase from each other, wherein when desalination tank 110 is undergoing hydrate formation phase, it takes the hydrate former from the storage tank 102, which hydrate former is being released in parallel from the desalination tank 802 during the hydrate dissociation phase. FIG. 8 shows the completion of this step and therefore there exists no hydrate in the desalination tank 802 and only hydrate former 804 and desalinated water 806 are present. Desalination tank 110, on the other hand, intakes the hydrate former during the hydrate formation phase and therefore contains the hydrate former 106, gas hydrates 108, and concentrated saline water 112.

Figure 9:
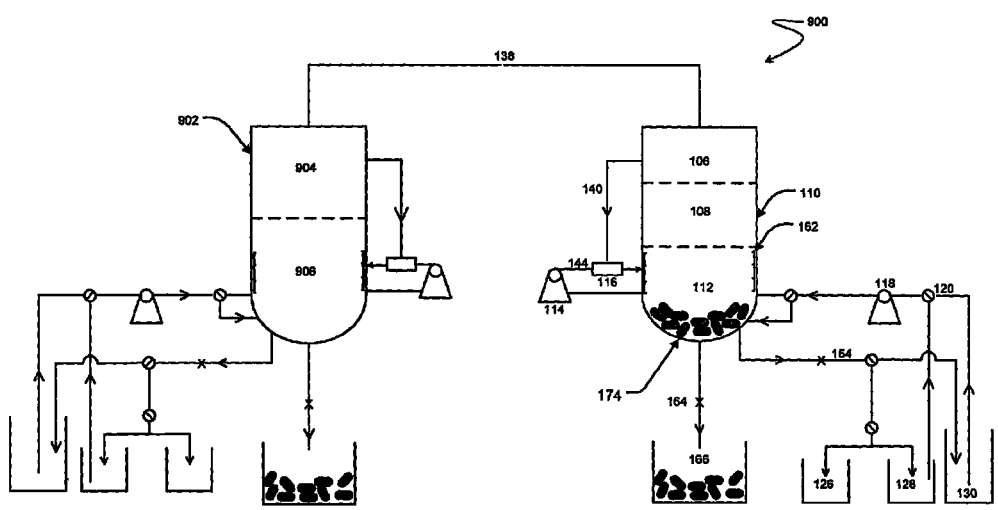
FIG. 9 illustrates ninth embodiment of the gas hydrate based desalination and/or water treatment system having two out-of-phase desalination tanks directly connected to each other with no storage tank.

FIG. 9 illustrates two out of phase desalination tanks 110 and 902 directly coupled to each other using a connection pipe 138 without a storage tank. Controlled amounts of hydrate former can initially be filled into the desalination tank 902 in a liquid state for the formation of gas hydrates in the desalination tank 110. Once the hydrates have been formed in desalination tank 110, the hydrate formation step can be carried out in desalination tank 902 during which the hydrate former 106 can be transferred from the desalination tank 110 into the desalination tank 902 because of pressure differential between the tanks through the connection pipe 138 such that the gas hydrate dissociation takes place in the desalination tank 110. FIG. 9 illustrates the step when the hydrate formation step is being carried out in the desalination tank 110 and the hydrate dissociation step is being carried out in the desalination tank 902 with 904 being the gas hydrates and 906 being the concentrated saline water. As there is no storage tank in the embodiment of FIG. 9, the hydrate former is stored in hydrate form partly in both or fully in either of the desalination tanks 110 and 902.

In a further embodiment, an external temperature control system can be provided for the desalination tank. The external temperature control system can include a pump and an off-the-shelf heat exchanger. Saline water can be re-circulated within the desalination tank through the pump and the external heat exchanger. The external heat exchanger can be configured to cool the saline water pumped through it and transfer the cooled saline water back to the desalination tank, thus lowering the temperature of the saline water inside the desalination tank and resulting in the formation of gas hydrates. Once the hydrates are formed and washed-off, low-salinity water can be pumped into the desalination tank so as to have sufficient water inside the desalination tank to enable re-circulation of the water. Subsequently, the same external system comprising of the pump and the external heat exchanger can be used to heat the low-salinity water and re-circulate it within the desalination tank, increasing the temperature of the low-salinity water inside the desalination tank and resulting in the dissociation of the gas hydrates.

It would be appreciated that, both the stand-alone as well as the thermally coupled system of the present invention can be fitted into a low-bed trailer and made mobile in a carrier such as a truck. The dimensions of the storage tank or the desalination tank can be modified to make the complete system fit into a low bed trailer. Dimensions of all other above described components can also be modified for increased efficiency in the proposed single tank apparatus and all such variations or modifications would be within the scope of the present invention. An air cooled freezer can also be incorporated into the apparatus to make the desalination system non-reliant on process water for cooling.

In an embodiment, the storage tank, desalination tank, and/or piping of the desalination apparatus of the present invention can be covered with a thermal insulation resulting in less heat transfer because of ambient conditions, making the system practically independent of ambient conditions.

The system and method of the present invention can be implemented using any of the hydrate forming gases such as methane, ethane, propane, $CO_2$, $H_2S$, noble gases etc., in all or any of the various system configurations described above and illustrated broadly in FIGS. 1 to 9 and can be optimized to work for any operating temperature conditions with due compromises in maximum attainable salinity in concentrated saline water.

Therefore, the present invention has numerous features and varied applications, which make it unique. In addition, it is based upon a number of non-obvious discoveries, which are a result of extensive research, analysis and insight into the fundamental processes of gas hydrate formation and their innovative application to the field of the invention. In addition, it solves a problem for which there has been no effective solution to date: low cost, high efficiency desalination of saline water with salinity ranging from low levels to the maximum possible eutectic composition, making it a single solution to all kinds of water desalination requirements. Further, it solves a very big water pollution problem by effectively, efficiently and inexpensively crystallizing salt out of eutectic brine ensuring almost complete recovery of desalinated/fresh water making it a unique solution for industries producing highly polluting high salinity water.

As used herein, and unless the context dictates otherwise, the term "coupled to" or "connected to" is intended to include both direct coupling/connection (in which two elements that are coupled to each other contact each other) and indirect coupling/connection (in which at least one additional element is located between the two elements). Therefore, the terms "coupled to" and "coupled with" and "connected to" and "connected with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" "comprised of" and "comprising" should be interpreted as referring to elements, parts, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

ADVANTAGES OF THE PRESENT INVENTION

The present invention provides for desalination and/or treatment of highly saline water ranging from low levels of salinity to the maximum possible levels of salinity in water.

The present invention provides a desalination system that uses one single vessel (desalination tank) to carry out different operations of the gas-hydrate based desalination process including hydrate formation, expulsion of concentrated highly saline/polluted water from the hydrate, hydrate washing and hydrate dissociation.

The present invention provides a desalination system that effectively maintains and controls the pressure and temperature of the overall system and specifically of the desalination tank and the storage tank.

The present invention provides a desalination system that maintains a liquid seal layer in the desalination tank for preventing the hydrate former from escaping.

The present invention provides a desalination system that can store the hydrate-former in a gaseous, liquid or hydrate form.

The present invention provides a desalination system that uses one or more desalination and/or storage tanks in multiple configurations.

The present invention provides a desalination system that allows multiple pairs of desalination and storage tanks to work together such that when one pair is operating in the hydrate formation phase, the other pair is operating in the hydrate dissociation phase.

The present invention provides a desalination system that makes gas hydrates from microbubbles of the hydrate-former.

The present invention provides a desalination system that crystallizes the salts from the highly saline water and suitably removes the same from the desalination tank.

The present invention provides a desalination system that operates as a batch process which makes it suitable for mobile applications.

The present invention provides a desalination system that can allow the free transfer of the hydrate-former between the desalination and the storage tanks by maintaining suitable temperatures and pressures in the tanks.

I claim:

1. A method of desalinating water, the method comprising the steps of:
    pumping feed water into a desalination tank from a feed water tank;
    adding a hydrate former to said feed water in said desalination tank so as to form gas hydrates and concentrated saline water in said desalination tank;
    discharging said concentrated saline water from a bottom outlet of said desalination tank to at least one of a group consisting of said feed water tank so as to add to said feed water and a saline water tank so as to form a saline water in said saline water tank;
    washing said gas hydrates with a wash water so as to remove surface salt and so as to form washed gas hydrates;
    dissociating said washed gas hydrates so as to form desalinated water and re-formed hydrate former;
    wherein the steps of adding said hydrate former, discharging said concentrated saline water, washing said gas hydrates, and dissociating said washed gas hydrates are carried out in said desalination tank, and
    wherein said desalinated water is formed in a batch mode, and
    wherein the step of adding said hydrate former comprises:
    transferring said hydrate former from a storage tank to said desalination tank; and
    transferring said re-formed hydrate former to said storage tank from said desalination tank according to a pressure differential between said storage tank and said desalination tank,
    wherein said hydrate former is selected from at least one of a group consisting of $C_1$-$C_5$ hydrocarbons, $CO_2$, $O_2$, $H_2$, $N_2$, $H_2S$, freon and inert gases.

2. The method of claim 1, wherein said desalination tank and said storage tank are connected through a connecting pipe said desalination tank and said storage tank being in fluid connection.

3. The method of claim 1, wherein said hydrate former is stored in said storage tank in a form selected from a group consisting of: a liquid form, a gaseous form, and a hydrate form.

4. The method of claim 1, wherein said hydrate former is stored in said storage tank in liquid form at a temperature equal to vapor liquid equilibrium temperature of said hydrate former at storage pressure, and wherein said storage pressure of said hydrate former is fixed lower than hydrate equilibrium pressure of concentrated saline water at said storage tank temperature.

5. The method of claim 1, wherein said feed water is pumped into the desalination tank from said feed water tank through a feed water pump, wherein the method further comprises:
    discharging said desalinated water from a bottom of said desalination tank; and
    storing said desalinated water in a fresh water tank.

6. The method of claim 5, wherein the step of washing said gas hydrates comprises the steps of:
    connecting said desalinated water to a plurality of nozzles in a portion of said desalination tank, said fresh water tank being in fluid connection with said plurality of nozzles; and
    spraying said gas hydrates with said desalinated water through said plurality of nozzles by said feed water pump, said wash water being comprised of said desalinated water.

7. The method of claim 1, wherein said gas hydrates are formed from microbubbles of said hydrate former.

8. The method of claim 1, wherein the step of adding a hydrate comprises the steps of:
    installing a microbubble generator in fluid connection with said desalination tank; wherein said microbubble generator comprises a microbubble nozzle and a microbubble pump;
pumping said saline water from said saline water tank through said microbubble nozzle with said microbubble pump;
creating a pressure difference between said microbubble nozzle and said desalination tank so as to form microbubbles in said microbubble nozzle; and
transporting said microbubbles to said desalination tank so as to form said gas hydrates,
wherein an amount of said gas hydrates corresponds to an amount of hydrate former consumed, an amount of concentrated saline water in said desalination tank, temperature during the steps of pumping said saline water, lowering pressure, and transporting said microbubbles, and pressure during the steps of pumping said saline water, lowering pressure, and transporting said microbubbles.

9. The method of claim 1, further comprising the steps of:
forming a crystallized salt from said concentrated saline water in said desalination tank;
collecting said crystallized salt in a salt crystal sump; and
forming a liquid seal at a bottom of said desalination tank with at least one of a group consisting of: a defined amount of said concentrated saline water, a defined amount of said desalinated water, and a defined amount of said wash water, said hydrate former being maintained in said desalination tank by said liquid seal.

10. The method of claim 1, further comprising the steps of:
thermally coupling another desalination tank to said desalination tank and another storage tank to said storage tank;
transferring heat from the step of adding said hydrate former in said desalination tank to said another desalination tank during a respective step of dissociating additional washed gas hydrates in said another desalination tank; and
transferring heat from the step of adding additional hydrate former in said additional desalination tank to said desalination tank during the step of dissociating said washed gas hydrates in said desalination tank.

11. The method of claim 1, further comprising the steps of:
thermally coupling a tank containing ice and water to said desalination tank;
melting said ice with heat from the step of adding said hydrate former in said desalination tank; and
freezing said water in said tank containing ice and water with heat loss from the step of dissociating said washed gas hydrates in said desalination tank.

12. The method of claim 1, further comprising the steps of:
connecting another desalination tank to said desalination tank through connecting pipes;
connecting said desalination tank and said another desalination tank to one hydrate former storage tank, said one hydrate former storage tank being a buffer tank for quantities of said hydrate former; and
providing said hydrate former for the step of adding said hydrate former in said desalination tank during a respective step of dissociating additional washed gas hydrates in said another desalination tank;
storing an additional re-formed hydrate former for the respective step of dissociating said additional washed gas hydrates in said another desalination tank during the step of adding said hydrate former in said desalination tank;
storing said re-formed hydrate former for the step of dissociating said washed gas hydrates in said desalination tank during a respective step of adding additional hydrate former in said another desalination tank; and
providing additional hydrate former for the step of adding said additional hydrate former in said another desalination tank during the step of dissociating said washed gas hydrates in said desalination tank.

13. The method of claim 1, the method further comprising the steps of:
connecting another desalination tank to said desalination tank through a connection pipe,
wherein the step of adding said hydrate former in said desalination tank corresponds to a respective step of dissociating additional washed gas hydrates in said another desalination tank, and
wherein a respective step of adding additional hydrate former in said additional desalination tank corresponds to the step of dissociating said washed pas hydrates in said desalination tank.

14. The method of claim 1,
wherein the step of adding a hydrate comprises the steps of:
installing a bell-shaped microbubble generator in fluid connection with said desalination tank so as to generate microbubbles; and
transporting said microbubbles to said desalination tank so as to form said gas hydrates,
wherein an amount of said gas hydrates corresponds to an amount of hydrate former consumed, an amount of concentrated saline water in said desalination tank, temperature during the step of installing so as to generate and transporting said microbubbles, and pressure during the steps of installing so as to generate and transporting said microbubbles.

15. An apparatus for desalinating water, said apparatus comprising:
a desalination tank being comprised of an upper portion, a middle portion, and a lower portion;
a storage tank coupled to said upper portion of said desalination tank through a connecting pipe so as to transport a hydrate former between said storage tank and said desalination tank;
a feed water tank in fluid connection to said desalination tank so as to transport a feed water from said feed water tank to said desalination tank;
a microbubble generator in fluid connection to said desalination tank, said microbubble generator being comprised of a microbubble nozzle and a microbubble generator pump, wherein said microbubble nozzle is connected to said lower portion of said desalination tank so as to expel microbubbles into hydrate former into saline water in said lower portion, wherein said middle portion has with gas hydrates from said microbubbles, and wherein said lower portion has a bottom outlet, said concentrated saline water being discharged from said desalination tank through said bottom outlet, when gas hydrates in said middle portion recede to said lower portion; and
a plurality of nozzles being located in said lower portion of said desalination tank and being connected to said desalinated water, each nozzle in a spraying relationship to said lower portion of said desalination tank so as to spray into said gas hydrates in said lower portion, wherein said bottom outlet of said desalination tank is in fluid connection with wash water from said lower portion and said desalinated water, wherein said gas hydrates are disassociated after washing so as to form desalinated water and re-formed hydrate former in said desalination tank, wherein said desalination water is formed in a batch mode, and wherein said storage tank is in fluid connection with said desalination tank so as to transfer said re-formed hydrate former from said desalination tank to said storage tank during.

16. The apparatus of claim 15, wherein microbubble generator pump connects to said desalination tank so as to pump water in said desalination tank through said microbubble nozzle, and wherein said microbubble nozzle is in fluid connection with said upper portion of said desalination tank so as to form a pressure differential between said upper portion and said microbubble nozzle, said microbubbles being in fluid connection with said middle portion of said desalination tank so as to form said gas hydrates.

17. The apparatus of claim 15, further comprising:
a saline water tank in fluid connection with said bottom outlet so as to transport said concentrated saline water between said desalination tank and said saline water tank; and
fresh water tank in fluid connection with said desalination tank so as to transfer said desalinated water between said fresh water tank and said desalination tank.

18. The apparatus of claim 15, wherein said hydrate former in said storage tank in a form selected from a group comprising a liquid form, a gaseous state, and a hydrate form, and wherein said hydrate former is selected from at least one of a group consisting of lower $C_1$-$C_5$ hydrocarbons, $CO_2$, $O_2$, $H_2$, $N_2$, $H_2S$, freon, and inert gases.

19. The apparatus of claim 15, wherein said hydrate former is comprised of ethane, wherein said storage tank is at a temperature at least less than −9.degree.C., and wherein said storage tank and said desalination tank have a constant at a value 19 bars or lower.

20. The apparatus of claim 15, further comprising:
a liquid seal at a bottom of said desalination tank, said liquid seal being comprised of at least one of a group consisting of said concentrated saline water, said desalinated water, and said wash water.

21. The apparatus of claim 15, further comprising:
an additional desalination tank thermally coupled to said desalination tank;
an additional storage tank thermally coupled to said storage tank; and
a heat pump system being positioned between said additional desalination tank and said desalination tank and between said storage tank and said additional storage tank, said heat pump system being comprised of: a refrigerant with a refrigerant compressor, an expansion valve, and a four way valve.

22. The apparatus of claim 21, wherein said desalination tank and said storage tank and said additional desalination tank and said additional storage tank are in a heat transfer relationship respectively.

23. The apparatus of claim 15, further comprising:
a tank containing ice and water thermally coupled to said desalination tank and said storage tank; and
a heat pump system being positioned between said tank containing ice and water and said desalination tank, said heat pump system being comprised of a refrigerant with a refrigerant compressor, an expansion valve, and a four way valve,
wherein said desalination tank, said storage tank, and said tank containing ice and water are in a heat transfer relationship.

24. The apparatus of claim 15, further comprising:
a pressure control valve between said storage tank and said desalination tank; and
a depressurization pipe between said storage tank and said desalination tank, wherein pressure in said storage tank and pressure in said desalination tank corresponds to said pressure control valve.

25. The apparatus of claim 24, further comprising:
a non-return valve in said depressurization pipe; and
an additional pressure control valve in said connecting pipe.

* * * * *